United States Patent
Matveev et al.

(10) Patent No.: US 11,960,982 B1
(45) Date of Patent: Apr. 16, 2024

(54) SYSTEM AND METHOD OF DETERMINING AND EXECUTING DEEP TENSOR COLUMNS IN NEURAL NETWORKS

(71) Applicant: Neuralmagic Inc., Somerville, MA (US)

(72) Inventors: Alexander Matveev, Cambridge, MA (US); Nir Shavit, Cambridge, MA (US); Govind Ramnarayan, Somerville, MA (US); Tyler Michael Smith, Somerville, MA (US); Sage Moore, Somerville, MA (US)

(73) Assignee: NEURALMAGIC, INC., Somerville, MA (US)

( * ) Notice: Subject to any disclaimer, the term of this patent is extended or adjusted under 35 U.S.C. 154(b) by 0 days.

(21) Appl. No.: 17/970,703

(22) Filed: Oct. 21, 2022

Related U.S. Application Data

(60) Provisional application No. 63/270,291, filed on Oct. 21, 2021.

(51) Int. Cl.
*G06N 3/04* (2023.01)
*G06N 3/02* (2006.01)
*G06N 3/0495* (2023.01)
*G06N 20/00* (2019.01)
*G06N 20/10* (2019.01)

(52) U.S. Cl.
CPC ............. *G06N 3/04* (2013.01); *G06N 3/0495* (2023.01); *G06N 20/10* (2019.01); *G06N 3/02* (2013.01); *G06N 20/00* (2019.01)

(58) Field of Classification Search
CPC ........ G06N 20/00; G06N 20/10; G06N 20/20; G06N 3/02; G06N 3/04; G06N 3/0495
See application file for complete search history.

(56) References Cited

U.S. PATENT DOCUMENTS

| | | |
|---|---|---|
| 5,577,166 A | 11/1996 | Mizuno |
| 7,747,070 B2 | 6/2010 | Puri |
| 9,558,156 B1 | 1/2017 | Bekas et al. |
| 9,811,775 B2 | 11/2017 | Krizhevsky et al. |
| 9,818,059 B1 | 11/2017 | Woo et al. |
| 10,157,045 B2 | 12/2018 | Venkataramani et al. |

(Continued)

FOREIGN PATENT DOCUMENTS

| | | |
|---|---|---|
| CN | 107832839 | 3/2018 |
| EP | 3 037 980 | 6/2016 |

(Continued)

OTHER PUBLICATIONS

Deshpande, A beginner's guide to understanding convolutional neural networks, Jul. 20, 2016.

(Continued)

*Primary Examiner* — Shane D Woolwine
(74) *Attorney, Agent, or Firm* — PEARL COHEN ZEDEK LATZER BARATZ LLP

(57) ABSTRACT

A system and method may partition and/or execute a NN, by, for a graph including nodes and hyper edges, each node representing a data item in the NN and each hyper edge representing an operation in the NN, identifying a deep tensor column comprising a subset of the nodes and a subset of the hyper edges, such that the operations in the deep tensor column, when executed, use only data which fits within a preselected cache.

20 Claims, 5 Drawing Sheets

(56) References Cited

U.S. PATENT DOCUMENTS

| | | |
|---|---|---|
| 10,223,333 B2 | 3/2019 | Chetlur et al. |
| 10,572,568 B2 | 2/2020 | Narayanamoorthy et al. |
| 10,685,082 B2 | 6/2020 | Bekas et al. |
| 10,719,323 B2 | 7/2020 | Baum et al. |
| 10,832,139 B2 | 11/2020 | Yan et al. |
| 10,970,619 B1 | 4/2021 | Xiao |
| 11,113,601 B1 | 9/2021 | Xiao |
| 11,216,732 B2 | 1/2022 | Zlateski et al. |
| 11,556,757 B1 | 1/2023 | Matveev |
| 2010/0076915 A1 | 3/2010 | Xu et al. |
| 2011/0119467 A1 | 5/2011 | Cadambi et al. |
| 2011/0296146 A1 | 12/2011 | Anand et al. |
| 2012/0311299 A1 | 12/2012 | Blumrich et al. |
| 2013/0138589 A1 | 5/2013 | Yu et al. |
| 2015/0127327 A1 | 5/2015 | Bacchiani et al. |
| 2016/0224465 A1 | 8/2016 | Morad et al. |
| 2016/0239706 A1 | 8/2016 | Dijkman et al. |
| 2016/0328643 A1 | 11/2016 | Liu et al. |
| 2016/0350645 A1 | 12/2016 | Brothers et al. |
| 2016/0358070 A1 | 12/2016 | Brothers et al. |
| 2016/0379109 A1 | 12/2016 | Chung et al. |
| 2017/0103313 A1 | 4/2017 | Ross et al. |
| 2017/0103317 A1 | 4/2017 | Young |
| 2017/0132496 A1 | 5/2017 | Shoaib et al. |
| 2017/0169567 A1 | 6/2017 | Chefd'Hotel et al. |
| 2017/0193136 A1 | 7/2017 | Prasad et al. |
| 2017/0193361 A1 | 7/2017 | Chilimbi et al. |
| 2017/0200094 A1 | 7/2017 | Bruestle et al. |
| 2017/0220524 A1 | 8/2017 | Herrero Abellanas et al. |
| 2017/0316311 A1 | 11/2017 | Pilly et al. |
| 2017/0316312 A1 | 11/2017 | Goyal et al. |
| 2017/0032487 A1 | 12/2017 | Ashari et al. |
| 2017/0372202 A1 | 12/2017 | Ginsburg et al. |
| 2018/0046900 A1 | 2/2018 | Dally et al. |
| 2018/0096226 A1 | 4/2018 | Aliabadi et al. |
| 2018/0173571 A1 | 6/2018 | Huang et al. |
| 2018/0253402 A1 | 9/2018 | Redfern et al. |
| 2018/0315159 A1 | 11/2018 | Ould-Ahmed-Vall et al. |
| 2018/0322390 A1 | 11/2018 | Das et al. |
| 2018/0336468 A1 | 11/2018 | Kadav et al. |
| 2019/0042250 A1 | 2/2019 | Anders et al. |
| 2019/0042542 A1 | 2/2019 | Narayanamoorthy et al. |
| 2019/0056916 A1 | 2/2019 | Varma et al. |
| 2019/0138902 A1 | 5/2019 | Matveev et al. |
| 2019/0156206 A1 | 5/2019 | Graham et al. |
| 2019/0156214 A1 | 5/2019 | Matveev et al. |
| 2019/0156215 A1 | 5/2019 | Matveev et al. |
| 2019/0370071 A1 | 5/2019 | Mateev et al. |
| 2019/0179818 A1 | 6/2019 | Lee |
| 2019/0205759 A1 | 7/2019 | Zhang |
| 2019/0212982 A1 | 7/2019 | Yoda et al. |
| 2019/0303743 A1 | 10/2019 | Venkataramani et al. |
| 2019/0318225 A1 | 10/2019 | Heineke et al. |
| 2019/0354894 A1 | 11/2019 | Lazovich et al. |
| 2019/0370644 A1 | 12/2019 | Kenney et al. |
| 2020/0034710 A1 | 1/2020 | Sidhu et al. |
| 2020/0089534 A1 | 3/2020 | Chen et al. |
| 2020/0090024 A1 | 3/2020 | Chen et al. |
| 2020/0097826 A1 | 3/2020 | Du et al. |
| 2020/0104717 A1 | 4/2020 | Alistarh |
| 2020/0117999 A1 | 4/2020 | Yoon |
| 2020/0160181 A1 | 5/2020 | Zlateski et al. |
| 2020/0160182 A1* | 5/2020 | Matveev ............. G06F 12/0875 |
| 2020/0193274 A1 | 6/2020 | Darvish Rouhani et al. |
| 2020/0218978 A1 | 7/2020 | Kopinsky |
| 2020/0320400 A1 | 10/2020 | David |
| 2020/0342301 A1 | 10/2020 | Miao et al. |
| 2021/0027197 A1* | 1/2021 | Foerster ................. G06N 3/105 |
| 2021/0049463 A1 | 2/2021 | Ruff |
| 2021/0174190 A1* | 6/2021 | Janssen .................... G06N 3/08 |
| 2022/0188631 A1* | 6/2022 | Kindrat ................. G06N 20/10 |

FOREIGN PATENT DOCUMENTS

| | | |
|---|---|---|
| WO | WO 2017/049496 | 3/2017 |
| WO | WO 2018/053835 | 3/2018 |
| WO | WO 2019/090325 A1 | 5/2019 |
| WO | PCT/US2019/063678 | 11/2019 |
| WO | WO 2020/046859 A1 | 3/2020 |
| WO | WO 2020047823 A1 | 3/2020 |
| WO | WO 2020/072274 A1 | 4/2020 |

OTHER PUBLICATIONS

Alwani et al., "Fused-layer CNN accelerators." 49th Annual IEEE/ACM International Symposium on Microarchitecture (MICRO), 2016, pp. 1-12.

Du et al., "Width Provably Matters in Optimization for Deep Linear Neural Networks", May 27, 2019, arXiv:1901.08572v3.

Gale et al., "The State of Sparsity in Deep Neural Networks", Feb. 25, 2019, arXiv:1902.09574v1.

Han et al., "Learning both Weights and Connections for Efficient Neural Networks", 2015, Advances in Neural Information Processing Systems, vol. 28.

Hinton et al., "Distilling the Knowledge in a Neural Network", Mar. 9, 2015.

Lavin et al., "Fast Algorithms for Convolutional Neural Networks", Nov. 10, 2015.

Lecun et al., "Optimal brain damage", Advances in neural information processing systems, 1990, pp. 598-605.

Mishra et al., "Apprentice: Using Knowledge Distillation Techniques to Improve Low-Precision Network Accuracy", Nov. 15, 2017.

Rusu et al., "Progressive Neural Networks", Sep. 7, 2016.

Budden et al., "Deep tensor convolution on multicores", In Proceedings of the 34th International Conference on Machine Learning, 2017, vol. 70, pp. 615-624.

Chen, Xuhao, "Escoin: Efficient Sparse Convolutional Neural Network Inference on GPUs." From Jul. 2017 "Conference '17", Apr. 3, 2019 (Apr. 3, 2019) Retrieved on Jan. 17, 2020 (Jan. 17, 2020)from <https://arxiv.orq/pdf/1802.10280.pdb entire document.

Georganas et al., "Anatomy Of High-Performance Deep Learning Convolutions On SIMD Architectures." In: SC18: International Conference for High Performance Computing, Networking, Storage and Analysis. Aug. 20, 2018 (Aug. 20, 2018) Retrieved on Jan. 17, 2020 (Jan. 17, 2020) from <https://arxlv.orq/pdf/1808.05567.pdf entire document.

Kim et al., "Designing Vector-Friendly Compact BLAS and LAPACK Kernels", SC17, Nov. 12-17, 2017, Denver, CO, USA.

Lascorz et al., "Bit-Tactical: Exploiting Ineffectual Computations in Convolutional Neural Networks: Which, Why, and How", Mar. 9, 2018.

Papyan et al., "Convolutional neural networks analyzed via convolutional sparse coding." In: The Journal of Machine Learning Research. Jul. 17, 2017 (Jul. 17, 2017) Retrieved on Feb. 20, 2020.

Scardapane et al. "Group sparse regularization for deep neural networks.", In: Neurocomputing. Jul. 2, 2016 (Jul. 2, 2016) Retrieved on Nov. 16, 2019 (Nov. 16, 2019).

Smith et al., "SPLATT: Efficient and parallel sparse tensor-matrix multiplication", 2015 IEEE International Parallel and Distributed Processing Symposium, IEEE, 2015, (Year: 2015).

Wozniak et al., "GIMMiK-Generating bespoke matrix multiplication kernels for accelerators: Application to high-order Computational Fluid Dynamics", Computer Physics Communications, vol. 202, 2016, pp. 12-22.

Zhangxiaowen Gong et al. "Sparse Train: Leveraging Dynamic Sparsity in Training DNNs on General-Purpose SIMD Processors"; 2019.

Kurtz, Mark, et al. "Inducing and Exploiting Activation Sparsity for Fast Neural Network Inference." Proceedings of the International Conference on Machine Learning. 2020.

Robert Lim; "Methods for Accelerating Machine Learning in High Performance Computing"; University of Oregon—AREA-2019-01.

(56) References Cited

OTHER PUBLICATIONS

Zhizhou Li et al.; "A CPU-based Algorithm for Traffic Optimization Based on Sparse Convolutional Neural Networks"; 2017 IEEE 30th Canadian Conference on Electrical and Computer (CCECE).

Baoyuan Liu et al.; "Sparse Convolutional Neural Networks"; CVPR 2015—Computer Vision Foundation—IEEE.

Hesham Mostafa et al.; "Parameter Efficient Training of Deep Convolutional Neural Networks by Dynamic Sparse Reparameterization"; Proceedings of the 36 th International Conference on Machine Learning, Long Beach, California, PMLR 97, 2019.

Israt Nisa et al.; "Sampled Dense Matrix Multiplication for High-Performance Machine Learning"; 2018 IEEE 25th International Conference on High Performance Computing (Hi PC).

Yuster, Raphael, and Uri Zwick. "Fast sparse matrix multiplication." ACM Transactions On Algorithms (TALG) 1.1 (2005): 2-13.

Paixao, Crysttian A., and Flávio Codeço Coelho. Matrix compression methods. No. e1049. PeerJ PrePrints, 2015.

Park, Jongsoo, et al. "Faster cnns with direct sparse convolutions and guided pruning." arXiv preprint arXiv:1608.01409 (2016).

https://www.kinematicsoup.com/news/2016/9/6/data-compression-bit-packing-101, published Sep. 6, 2016.

O. Kaya and B. Uçar, "Scalable sparse tensor decompositions in distributed memory systems," SC '15: Proceedings of the International Conference for High Performance Computing, Networking, Storage and Analysis, Austin, TX, USA, 2015, pp. 1-11, doi: 10.1145/2807591.2807624.

Baoyuan Liu, Min Wang, H. Foroosh, M. Tappen and M. Penksy, "Sparse Convolutional Neural Networks," 2015 IEEE Conference on Computer Vision and Pattern Recognition (CVPR), Boston, MA, 2015, pp. 806-814, doi: 10.1109/CVPR.2015.7298681.

Yang, Huanrui et al. "DeepHoyer: Learning Sparser Neural Network with Differentiable Scale-Invariant Sparsity Measures." ArXiv abs/1908.09979 (2019).

Samuel Williams, Andrew Wsterman, David Patterson "Roofline: an insightful visual performance model for multicore architectures" Communications of the ACMvol. 52Issue 401 Apr. 2009pp. 65-76 https://doi.org/10.1145/1498765.1498785.

Han, Qingchang, Yongmin Hu, Fengwei Yu, Hailong Yang, Bing Liu, Peng Hu, Ruihao Gong, Yanfei Wang, Rui Wang, Zhongzhi Luan and Depei Qian. "Extremely Low-bit Convolution Optimization for Quantized Neural Network on Modern Computer Architectures." Proceedings of the 49th International Conference on Parallel Processing (2020).

Elias Frantar, Sidak Pal Singh, Dan Alistarh "Optimal Brain Compression: A Framework for Accurate Post-Training Quantization and Pruning" Published at NeurIPS 2022.

Paulius Micikevicius, Dusan Stosic, Neil Burgess, Marius Cornea, Pradeep Dubey, Richard Grisenthwaite, Sangwon Ha, Alexander Heinecke, Patrick Judd, John Kamalu, Naveen Mellempudi, Stuart Oberman, Mohammad Shoeybi, Michael Siu, Hao Wu "FP8 Formats for Deep Learning" arXiv:2209.05433, Sep. 12, 2022.

James Skelton "Understanding Tensor Cores", printed on May 14, 2023 https://blog.paperspace.com/understanding-tensor-cores/.

Lilian Weng "Large Transformer Model Inference Optimization" Jan. 10, 2023 202 https://lilianweng.github.io/posts/2023-01-10-interference-optimization/.

Yu, Dong, Li Deng, and Frank Seide. "The deep tensor neural network with applications to large vocabulary speech recognition." IEEE Transactions on audio, speech, and language processing 21.2 (2012): 388-396. (Year: 2012).

Smith, Shaden, et al. "SPLATT: Efficient and parallel sparse tensor-matrix multiplication." 2015 IEEE International Parallel and Distributed Processing Symposium. IEEE, 2015: 61-70 (Year: 2015).

Yang, Yongxin, and Timothy Hospedales. "Deep multi-task representation learning: A tensor factorisation approach." arXiv preprint arXiv:1605.06391 (2016): 1-12 (Year: 2016).

Matveev, Alexander, et al. "A multicore path to connectomics-on-demand." Proceedings of the 22nd ACM Sigplan Symposium on Principles and Practice of Parallel Programming. 2017: 267-281 (Year: 2017).

Georganas, Evangelos, et al. "Anatomy of high-performance deep learning convolutions on simd architectures." SC18: International Conference for High Performance Computing, Networking, Storage and Analysis. IEEE, 2018. (Year: 2018).

Gelashvili, Rati, Nir Shavit, and Aleksandar Zlateski. "L3 fusion: Fast transformed convolutions on CPUs." arXiv preprint arXiv:1912.02165 (Dec. 4, 2019). (Year: 2019).

Lin, Yu-Sheng, Wei-Chao Chen, and Shao-Yi Chien. "MERIT: Tensor transform for memory-efficient vision processing on parallel architectures." IEEE Transactions on Very Large Scale Integration (VLSI) Systems 28.3 (2019): 791-804. (Year: 2019).

* cited by examiner

SYSTEM AND METHOD OF DETERMINING AND EXECUTING DEEP TENSOR COLUMNS IN NEURAL NETWORKS

RELATED APPLICATION DATA

The present application claims benefit from U.S. provisional Patent Application No. 63/270,291, filed on Oct. 21, 2021, entitled "DEEP TENSOR COLUMN ALGORITHM", incorporated herein by reference in its entirety.

FIELD OF THE INVENTION

The present invention relates generally to the field of neural networks. More specifically, the present invention relates to partitioning and executing sections of neural networks spanning multiple layers.

BACKGROUND OF THE INVENTION

Neural networks (NN) or connectionist systems are computing systems inspired by biological computing systems, but operating using manufactured digital computing technology. NNs are made up of computing units typically called neurons (which are artificial neurons or nodes, as opposed to biological neurons), arranged in layers and communicating with each other via connections, links or edges. In common NN implementations, the signal at the link between artificial neurons or nodes can be for example a real number, and the output of each neuron or node can be computed by function of the (typically weighted) sum of its inputs, such as a rectified linear unit (ReLU) function. NN links or edges typically have a weight that adjusts as learning proceeds.

In practice, a NN, or NN learning, can be simulated by one or more computing nodes or cores, such as generic central processing units (CPUs, e.g. as embodied in personal computers) or graphics processing units (GPUs such as provided by Nvidia Corporation), which can be connected by a data network. A NN can be modelled as an abstract mathematical object and translated physically to a CPU or GPU as for example a sequence of matrix operations where entries in the matrix represent neurons (e.g. artificial neurons connected by edges or links) and matrix functions represent functions of the NN. CPUs typically have few cores (e.g. less than 10, or several tens; while GPUs typically have thousands of cores.

NNs are often organized in layers, from input through hidden layers, to output, where layers closer to the input typically execute in an execution order before layers towards the output. When discussed herein a previous or earlier layer is located more towards the input of the NN than layers that are later, after, or subsequent: thus typically layer X immediately previous to layer Y sends its output to layer Y, and layer Y is subsequent to layer X. An earlier layer more towards NN input is before a later layer that is more towards NN output. Going backwards typically means going towards NN input.

One difficulty with computing each layer at a time (e.g. an entire layer before computing the next layer) can include a requirement that memory size used to store intermediate layer values be driven by a width of the largest layer in the particular NN.

SUMMARY OF THE INVENTION

A system and method may partition and/or execute a NN, by, for a hypergraph (or computation graph) including nodes and hyperedges, each node representing a data item in the NN and each hyper edge representing an operation in the NN, identifying a deep tensor column comprising a subset of the nodes and a subset of the hyper edges, such that the operations in the deep tensor column, when executed, use only data which fits within a preselected cache.

Embodiments may partition or break down a computation graph describing or corresponding a NN into tensor column tasks (e.g. units of computation) that span many layers or even the full depth of the NN. This may be performed in a way that flexibly adapts to the resources on the processor (e.g. CPU) architecture detected at model compilation time, during the process of preparing the system to perform inferences using the neural network on a certain machine. Embodiments may allow efficient execution of NNs on CPUs.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
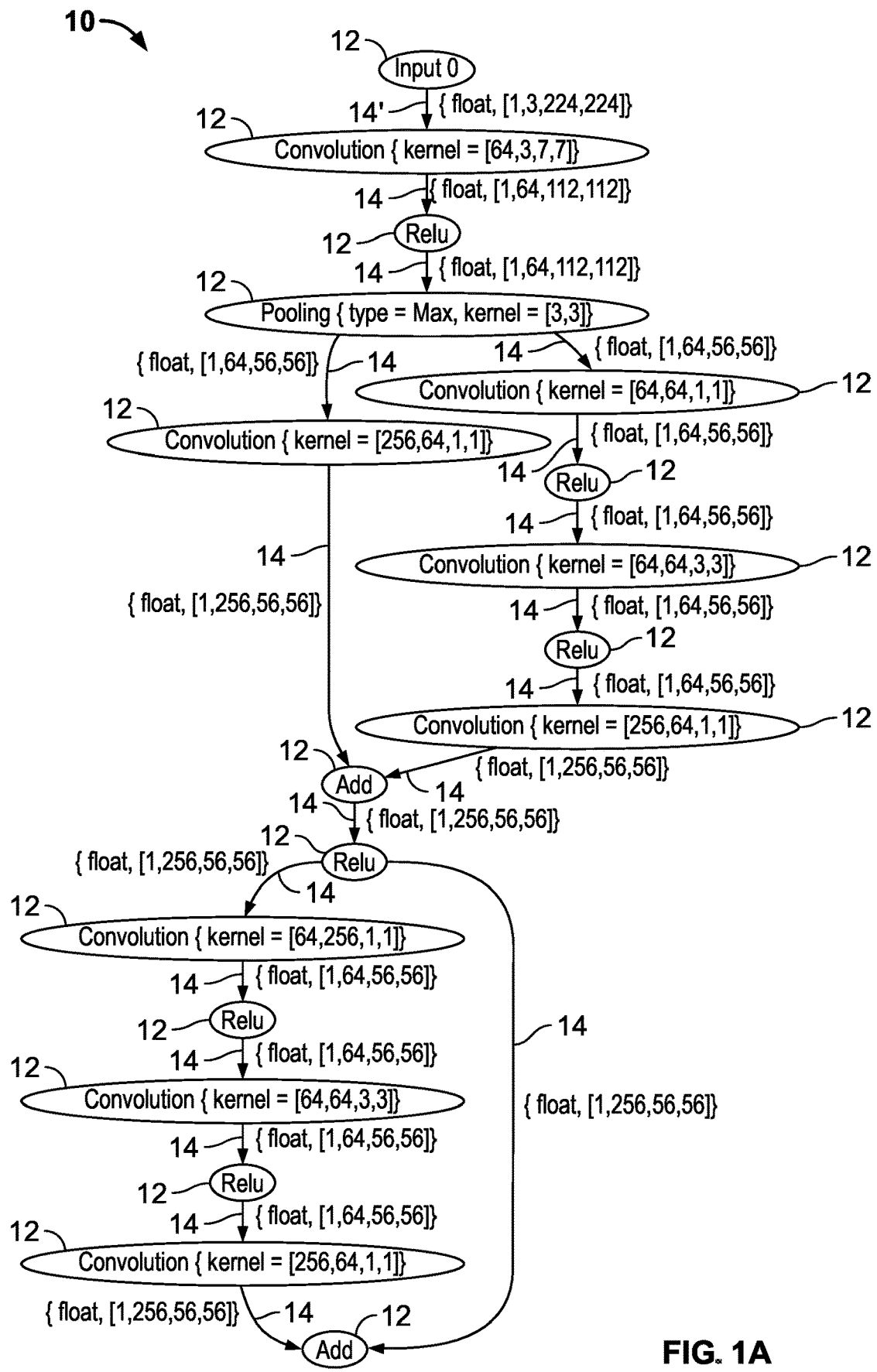
FIG. 1A depicts a portion of a NN according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in specific forms other than the examples presented herein without departing from the spirit or essential characteristics thereof. The foregoing embodiments are therefore to be considered in all respects illustrative rather than limiting of the invention described herein. Scope of the invention is thus indicated by the appended claims, rather than by the foregoing description.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer or other electronic computing device, that manipulates and/or transforms data represented as physical (e.g., electronic) quantities within the computer's registers or memories into other data similarly represented as physical quantities within the computer's registers and/or memories or other non-transitory storage medium that may store instructions to perform operations and/or processes.

The term set when used herein may include zero or more items. Unless explicitly stated, the method embodiments described herein are not constrained to a particular order or sequence. Some of the described method embodiments or elements thereof can occur or be performed simultaneously, at the same point in time, or concurrently.

In prior systems for executing NNs, during execution a layer may be executed and after all of the outputs of the layer are written, only at this point, the outputs of the layer may be read as input to the subsequent layer. Thus previously available systems may require complete processing of one layer before moving on to compute or execute the next layer. This may cause excessive memory access, as the outputs need to be written to memory then read again. Embodiments of the present invention may ameliorate this problem by dividing or partitioning NN processing into tensor columns, where each of a number of layers is only partially processed, with the partial output of one layer being provided as the partial input to another layer. A deep tensor column according to some embodiments may include a set of elemental operations which together form a portion and not the entirety of a layer of the NN; however deep tensor column operations may encompass entire layers. An elemental operation may be, e.g. one matrix multiplication, one ReLU operation; a deep tensor column operation may include multiple elemental operations. In some cases the intermediate output/input between layers may be stored in a processor's cache without being written to/read from memory (e.g. an external memory, separate from the processor(s), which typically has much larger read/write times than cache storage). This reduces the delay of writing and reading from memory, but may introduce the problem of repeated processing—e.g. overlaps—of some NN calculations.

Embodiments using tensor columns may process a NN by dividing computations (e.g., training of the NN and/or executing or inferring the NN) into tasks in a manner that can be agnostic to the layered structure of the network. The NN may thus be broken down into asynchronously executable pyramid-shaped or tensor column-related tasks that can cross layer boundaries. Systems and methods for executing (e.g., inferring) and/or training of NNs may employ computation among general-dimension matrices, commonly referred to as "tensors". A tensor column, as opposed to a tensor which is a multi-dimensional matrix, may be considered to be a unit of computation (e.g. a task, computational task or sub-computation) that takes as input a subset of input to an area of a NN and computes a subset of output for this area of the NN. A tensor column according to one embodiment may have all its computation, through multiple layers, typically executing only a portion of each layer, carried out by having the outputs of one layer be saved in cache as inputs to the next layer, without the need to store them to memory (e.g. memory separate from fast caches; e.g. memory external to a processor). A cache may be used to create a series of buffers that replace reading and writing from memory which is what a typical GPU or similar specialized processor would do. A tensor column may describe a tensor or a set of tensors that may be employed by embodiments of the present invention, and may include computations for a column (rather than a complete layer) of neural nodes of the NN, thus allowing improved parallelism in execution of the NN computations.

In-cache execution as described herein may improve and speed up processing in various processing environments by using the cache hierarchy of the processor to avoid expensive memory-bound computations. In memory bound computations, performance improvements from software may be achieved by reducing the memory access requirements of the computation or by speeding up data movement (e.g., by reading and/or writing to caches instead of memory). The popular Roofline performance model shows how optimal performance on a fixed hardware may be achieved by workloads with a certain operational intensity, which measures the ratio of compute to memory accesses in a workload (this ratio is also commonly referred to as CMR, the compute to memory ratio). When applied to sparse neural network computation, the benefits of in-cache execution become even larger, since these computations are typically more memory bound than those of dense neural networks. Pruning may reduce the amount of computation needed to execute the network, but also may reduce the rate of computation by the CPU, since it makes the computation more memory-bound. To improve performance, embodiments of the invention may partition or "rewrite" sections of the computation using deep tensor columns, to reduce the reads and writes to memory. Since the resulting computation may be memory-bound, this may directly improve the CPU's rate of computation. Reducing the number of memory accesses via tensor columns may make the workload less memory-bound, moving the workload closer to the "joint" of the Roofline plot and increasing effective performance. As long as tensor columns do not increase the overall number of operations, e.g. FLOPs (floating point operations per second), in the workload by too much, this may translate to faster inference and training.

Embodiments may ensure, or increase the likelihood, that a process reads or writes to/from cache (e.g. fits in cache) by designing the process such that the size of the process's memory accesses, in combination with the cache policy of the target architecture on which the process executes, means that when the process's instructions specify writes to or reads from a memory external to the processor's registers, the data instead of requiring a memory access at the time of the execution of the instruction, remains in cache until and unless the data is needed to be read from memory or needs to be written to memory. Data, code, or other items to be stored may be considered to fit within a cache when, during execution in a processor according to the processor's cache policy, it is expected that the data will not be accessed again during a task. For example, a process may be designed with instructions that write certain data to memory, but such that the amount of data written (or the structure of the data), means that the cache policy will, at least for some time, keep the data in cache. The data may eventually be written to memory, but hopefully only once, at a later time, rather than requiring repeated memory accesses after each layer. In some embodiments, a process "fitting" in cache may mean the instructions in the process fit within the cache as well as the data. For example, typically, in an L1 cache, there are separate caches for instructions and data (called the L1I and L1D caches), but for L2 and lower the data and instructions are combined in the same cache. Other cache structures may be used, and in some embodiments "fitting" in cache does not require both data and instructions to fit in cache.

This concept is also applied to the different levels of cache discussed herein: a process may be designed to write to a certain level of cache (e.g. L2) by having the amount and/or structure of memory writes in combination with the cache policy mean that the data stays mostly in L2 cache, at least for some time. For example, overflows of L2 cache may require access to L3 cache, which may be avoided: e.g. a tensor column, as described herein may keep its data generally in a private cache without need to access a shared cache, except at the beginning and end of the tensor column processing.

Target architectures may include for example AMD's EPYC or Zen series of processors, or Intel's Xeon, Core, or Pentium processors, ARM (Advanced RISC Machines) Cortex or Neoverse processors, and other processors.

A tensor column may be a portion of a NN executed typically as one block separate from the execution of other tensors from the same NN; thus the execution of the NN may be partitioned. A tensor column may refer both to the process that executes the relevant section of the NN, and also to the data structures defining these processes. A tensor column may be partitioned into multiple tensor columns (which may be sub-tensor columns sized to fit into a cache), and typically each of these partitioned tensor columns executes as one single task, e.g. in some embodiments tensor columns and tasks are related one-to-one. A tensor column may execute subsequent portions of multiple NN layers, at least one portion being less than the entirety of a layer (some tensor columns may occupy a full layer, although this typically should not occur in an output layer for the tensor column).

Embodiments may improve NN processing by using tensor columns while reducing or eliminating redundant or duplicative processing which may occur with such processing. Embodiments may improve NN processing by partitioning NNs with structures beyond specific NN structures such as convolutional neural networks (CNNs); this improvement may be using a graph representation of a NN as described herein. Deep tensor columns as described herein may exploit large CPU caches to perform aggressive cache reuse, improving processing by reducing use of high bandwidth memory. In some sense, embodiments of the present invention may use sparsity in combination with deep tensor columns to make a CPU perform like a GPU.

NN weights and inputs represented as matrices may be calculated faster if sparsity is introduced. Sparsity may reduce compute burden by, e.g., 10-20 times, eliminating the need for excessive numbers of GPU or CPU cores. A matrix is sparse if it contains a lot of entries that are zero (0). While the input matrix of data to be processed at inference or run time (and the sparsity of the input matrix) is usually out of the network designer's control, the weights of the neural network can be made sparse using pruning.

Embodiments may form tensor columns by creating a subgraph of the neural network computation, which may include multiple operations, and partitioning the graph depthwise into tasks that fit into a target cache (e.g. unlikely to be evicted from the cache). Given an operation and some portion of its output, the preimage may be the portion of its input that is required to compute the output. Given a section of the output of some layer in the NN, a process may take its preimage through multiple preceding layers in the NN to see what regions of previous layers the preimage depends on (e.g. what regions' processing is required for the preimage to process).

Tensor columns execute layers depthwise to compute sections of the output without needing to construct the entirety of intermediate buffers (e.g. without computing an entire layer) before the output of the tensor column. By doing so, the tensor columns may save on reads and writes to main memory by ensuring that the tasks are executed in cache. However, this may not reduce the number of operations or FLOPs in the network, even potentially increasing the number of FLOPs. If performed incorrectly, executing using tensor columns can significantly slow down neural network inference. Embodiments of the present invention may use algorithms that find tensor columns that balance the computation and data movement, given the properties of the problem and the cache hierarchy, which improves sparse neural network inference.

"Fitting" into a target cache may mean that the size of the data used to execute the tensor column is not larger than the target cache, such that after initial data is read from memory or another cache into the target cache, the processor need only read from and write to the target cache in order to carry out its computation. In particular, the processor in some examples does not need to read or write any data to a cache larger than the target cache or main memory in order to carry out the computation.

When used herein, an operation in a graph may refer to a number of individual operations in a NN. For example, an operation in a graph may include the entirety of a layer of a NN, or a portion (e.g. not the entirety of the layer) of a layer of a NN, and as such may include multiple convolutional matrix multiplications, or multiple ReLU operations, or multiple other operations. In some embodiments, an operation in a graph may correspond to one individual NN operation, e.g. one ReLU computation.

Embodiments of the invention may create and use deep tensor columns which can be applied to general subgraphs of a NN's computation, rather than simply subgraphs that are paths (e.g. each operation has a single output, and the output of each operation is only read once). Importantly, deep tensor columns according to some embodiments may be based on patterns that do not need to have a simple path-like structure from input to output; instead in some embodiments intermediate layers can be read or written by multiple other layers in the tensor column, allowing an embodiment to apply to network structures not previously conducive to tensor columns (e.g. embodiments may apply to YOLO ("you only look once") and BERT ("bidirectional encoder representations from transformers") models). Path in this context may mean a graph theory path mapping data throughout the NN, as opposed to a conventional model mapping connections among neurons in a NN.

Such graphs, when converted or partitioned to tensor columns and processed as part of NNs (e.g. by being compiled and executed), according to current embodiments can improve NN processing by potentially be much deeper than previously used tensor columns (e.g. involve more sequential operations). One reason for this is that kernels may be smaller for quantized networks (if quantization is used), and so more can be simultaneously stored in cache as compared to prior methods. Another reason is that a graph structure as described herein can be more generic in the sense that it applies to any NN, rather than relying on specific structures found in, for example, CNN structures to identify tensor columns, and so it can include sub-structures that previously would be impossible to put into prior art simpler tensor columns.

Deep tensor columns as described herein may be much more flexible and powerful than ordinary prior art tensor columns. However, this lack of structure may come at a price: choosing poor deep tensor columns can not only fail to improve performance, but it can actually hurt it. Hence, embodiments may design algorithms that create deep tensor columns that will improve performance, based on an understanding of the Roofline model and memory-bounded computation.

Embodiments include detection algorithms to detect and/or define deep tensor columns. Such algorithms may break a NN into deep tensor columns. In addition to creating deep tensor columns out of subgraphs with arbitrary graph structures, embodiment include detection logic described differing from previous tensor column detection in for example:

1. It can take into account aspects of the system detected at runtime: for example, relevant cache sizes and number of cores.
2. It can use generic properties of the operations in the subgraph (e.g. number of FLOPs, amount of data movement, etc.), rather than just pattern-matching specific sequences of operations (e.g. convolution followed by pooling). This improvement ties it closer to the Roofline model that motivates these optimizations, and improves its flexibility, so it can be applied to the diverse NN architectures used for varied tasks in modern machine learning (e.g. image classification, object detection, natural language processing, etc.).

These example properties of algorithms used in some embodiments may allow an embodiment to be much more informed about the optimizations made, making them more adaptable to new network architectures and architectures with different resources, such as larger or smaller caches, different numbers of cores, or even a completely different cache hierarchy. Example pseudocode is provided herein for example deep tensor column detectors which may take sections of an input NN network (also known as subgraphs, where the NN is viewed as a graph) that may be extremely memory-bound (e.g. including entirely shuffles and mathematical operations applied elementwise to the activations), and may create tasks that fit in a small layer of cache (e.g., L2 cache).

This may produce multiple improvements, for example: 1) Making tensor columns from subgraphs including extremely memory-bound layers can provide extremely good performance improvements (e.g., per the Roofline model), and furthermore since the subgraph may have very little compute in it, any compute overhead from tensor columns is unlikely to slow down the overall computation. This makes it much less likely to accidentally worsen performance with poorly assigned tensor columns; and 2) The code for task breakdown or partitioning may simply need to consider fitting into a single layer of cache, and is hence simpler than general task breakdowns that utilize multiple layers of cache simultaneously.

FIG. 1A depicts a portion of a NN according to embodiments of the present invention. While FIG. 1A depicts a portion of a Residual NN (ResNet), embodiments of the invention may work with other types of NNs, e.g. CNN, YOLO and BERT models.

Referring to FIG. 1A, a portion of a ResNet NN, including neurons arranged in layers, the neurons connected by links, is represented as a graph 10. In FIG. 1A, the first two "blocks" of Resnet50 (e.g., the first 18 operations) are depicted. (The Resnet50 NN is ResNet NN including 48 convolution layers along with 1 MaxPool and 1 Average Pool layer.) In FIG. 1, vertices 12 represent operations such as convolution, ReLU, and pooling, and edges 14 represent data or dependencies between edges. Vertices 12 represent one or more elemental operations of the labelled type; e.g. a vertex 12 labelled convolution represents one or more (typically many) individual convolutional operations. One example item of data 14 is a tensor (a tensor which is a multi-dimensional matrix, as opposed to a tensor column or deep tensor column) of floating point numbers with dimension 1, 3, 224 and 224, which can be interpreted in one example as a single image of size 224×224 pixels, with each pixel containing a red, green, and blue value.

Figure 1B:
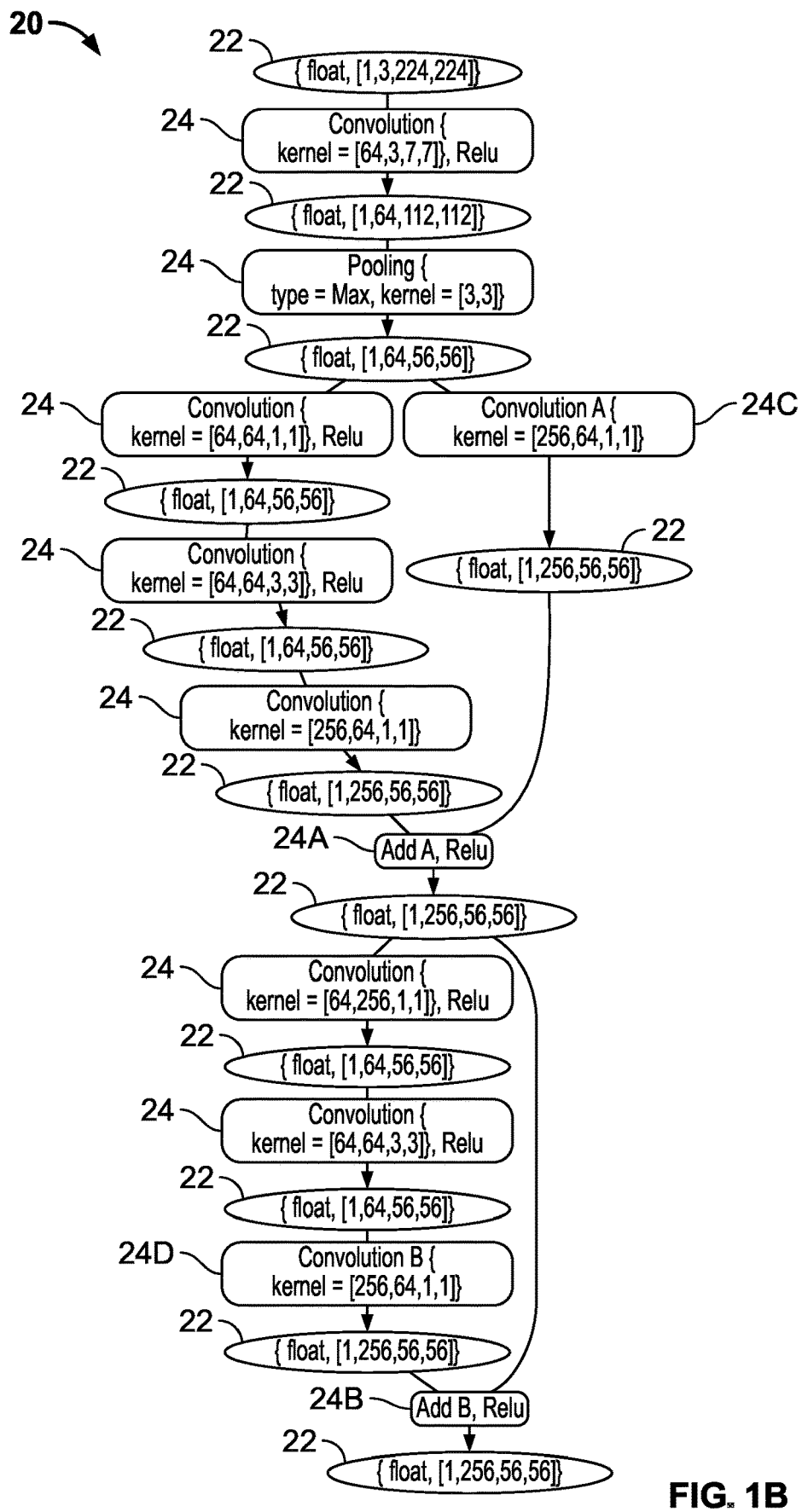
FIG. 1B is a hypergraph representation of the portion of the NN of FIG. 1A according to embodiments of the present invention.

FIG. 1B is a hypergraph representation of the portion of the NN of FIG. 1A according to embodiments of the present invention. Referring to FIG. 1B, in hypergraph 20, the ovals 22 represent graph vertices, which (opposite to the representation in FIG. 1A) represent data or tensors. Rectangles 24 are hyper edges, which represent operations (one or more elemental operations). Rectangles 24A, 24B, 24C, and 24D in FIG. 1B are explained with respect to FIG. 1C.

Figure 1C:
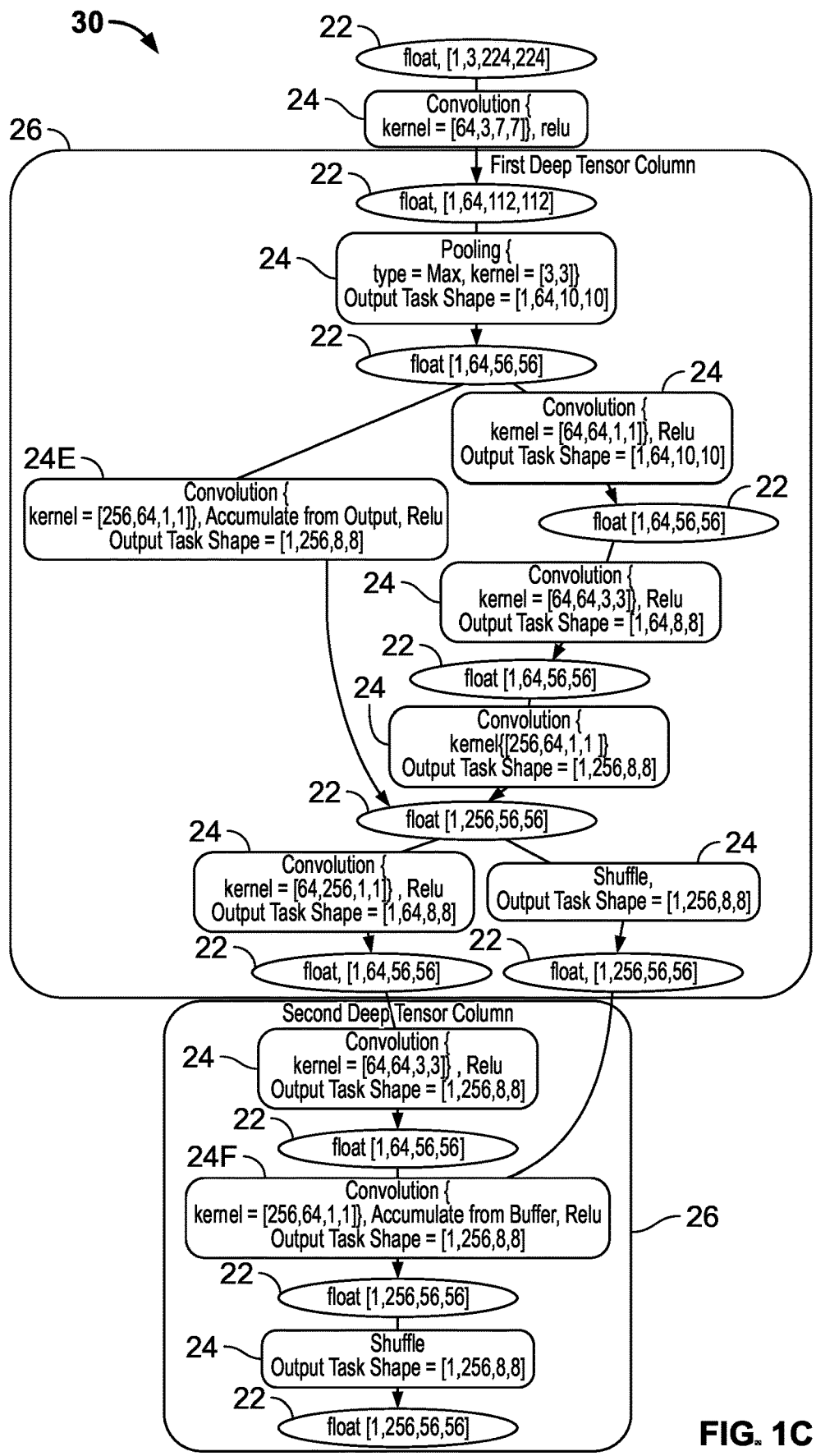
FIG. 1C is a hypergraph representation of the portion of the NN of FIG. 1B rewritten or partitioned into multiple deep tensor columns, according to embodiments of the present invention.

FIG. 1C is a hypergraph representation of the portion of the NN of FIG. 1B rewritten or partitioned into multiple deep tensor columns, according to embodiments of the present invention. The partitioning in graph 30 in FIG. 1C has been performed by a low-CMR detector as disclosed herein, but other partitioning methods may be used. In FIG. 1C ovals 22 represent graph vertices, which represent data or tensors. Rectangles 24 are hyper edges, each representing one or more elemental operations. In FIG. 1C the two add operators 24A and 24B seen in FIG. 1B have been fused onto preceding convolution operators 24C and 24D in FIG. 1B to form in FIG. 1C operations 24E and 24F. Convolution operation 24E has been labeled "Accumulate from output", which means in this example that the operation reads from its output buffer before writing to it and sums the result with the result of the convolution. The other convolution operation 24F is labeled "Accumulate from buffer", which means that the operation reads from a separate buffer and sums it with the result of the convolution.

The output task shape on each hyper edge 24 is the shape of the subset of the output that a single task will compute for that operation. Each deep tensor column 26 includes one or more vertices (data) and hyper edges (operations), and each deep tensor column 26 has an internal structure represented as a hyper graph. When considering the global NN (the entirety of a NN), a tensor column may be represented as a single hyper edge.

Embodiments may shorten or reduce the regions of a NN with computational overlaps, and improve execution by reducing memory access and in some embodiments, in addition, duplicate execution.

Embodiments may be generalized to memory hierarchies other than those using, for example, an L2 and L3 cache, or private and shared caches. Embodiments may optimize any suitable hierarchical memory structure that includes small, fast memory layers as well as larger, slower ones. For example, embodiments may be used with hierarchies that involve L2, L3, and IA caches. While certain processes are associated in examples herein with certain caches in other embodiments processes may operate with different caches, and tensors need not execute within a private cache.

Embodiments may use an algorithm such as a "Low CMR Detector", a greedy algorithm (e.g. an algorithm making the locally optimal choice at each stage, and not taking into account global optimization) for detecting deep tensor columns. An example algorithm includes a detect_and_rewrite_low_cmr_subgraphs( ), function, which may call a function in a detector, named in the example herein detect_breakdown( ).

An example detect_and_rewrite_low_cmr_subgraphs( ) function may take as input a hyper-graph, where, opposite to a standard NN representation, the nodes represent data (e.g. graph nodes may represent one or more data items, such as some description or definition of data passed from one set of NN nodes to another set of NN nodes) and the edges or hyperedges (e.g. links) represent one or more operations (typically groups of elemental operations: elemental operations may be individual operations, for example convolutions, matrix multiplications, additions, softmax, pooling, shuffles, etc.), and the edges or hyperedges have been ordered so that all data used as input for an operation B is written as output by some operations A1, . . . , An, all of which come before B in the order. For example, a data item may be written as e.g. float[1, 64, 56, 56], which means that it is a tensor with the shape [1, 64, 56, 56], whose elements are stored as a 32-bit floating point value. The weights or kernels of an operation are embedded in the operation (e.g. convolution or gemm (general matrix-matrix multiplication)) that they are used in and are written as e.g. kernel [64, 64, 1, 1]. The vertices in one example are marked with their data type and the shape of the tensor. (Note: nodes in the graph are to be distinguished from the nodes that make up the NN; and in other conventions a NN representation may instead have nodes representing operations and edges representing data or dependencies between operations; in the present application nodes instead represent data and edges (links between nodes, typically represented as lines) represent operations.) This may be termed a topological order of the operations, as it draws inspiration from topological ordering in graph theory. The deep tensor column detector may identify subgraphs (e.g. deep tensor columns) of the input graph (e.g., representing the data flow of the entire NN) that satisfy two conditions:

The subgraph includes operations that are adjacent (e.g. contiguous operations) in the order.
The subgraph includes entirely operations (e.g. NN operations such as pools) with few FLOPs (e.g. those that have low compute-to-memory ratio, or CMR). This may be based for example on a human-tuned threshold. For example, an example threshold of 0.7, e.g. 7 elementary operations per 10 elements read and elements written may be a threshold below which an operation is deemed to have a "low" CMR; other thresholds may be used.
Each subgraph may be turned into a deep tensor column.

When the above example conditions are satisfied, the deep tensor column detector tries to find a good depthwise execution for this subgraph, by passing the subgraph to an example detect_breakdown( ) function. Detect_breakdown( ) may find tasks that span the subgraph depthwise such that all the data buffers needed to carry out this task can be contained in (e.g. fit within, or execute within) a particular target cache (e.g. an L2 cache). If it can find such tasks, it may rewrite the subgraph into a single "deep tensor column" operation, with this task breakdown encoded into the operation.

To implement this, an algorithm may store a data structure (e.g., called a path decomposition in graph theory) that encodes what data the algorithm has written that will be needed later in the computation. From this structure, an algorithm can deduce how many buffers (e.g. memory allocations) are needed to keep track of throughout the computation as well as a pattern for buffer reuse, since an algorithm can repurpose an existing buffer to store new data as long as the data it originally stored is not needed anymore.

For a fixed output task, an algorithm may take the preimages of the task throughout the tensor column, which allows the algorithm to determine the amount of data needed to store at each node. This can be used to provide the amount of data needed to carry out the task, which may be compared to available target (e.g. L2) cache size. If the amount of data needed exceeds the available target cache size, the algorithm may shrink the size of the output task, and try again. If no shrinking is possible, the algorithm may reject the subgraph by returning "nullopt" to detect_and_rewrite_low_cmr_subgraphs( ). In example FIG. 1C, in FIG. 1, the output task shape has been "shrunk" from a size of [1,256,56,56] to a size of [1,256,8,8].

In the case where detect_breakdown( ) returns nullopt to detect_and_rewrite_low_cmr_subgraphs( ), the latter function may construct "prefix subgraphs" including some prefix of the ordered hyper edges in the subgraph, in an attempt to find some subgraph (of the initial subgraph) that can be rewritten into a deep tensor column. It then passes all these prefix subgraphs to detect_breakdown( ), from largest to smallest, to find some subgraph that can be rewritten. If it manages to rewrite some subgraph in this process, it moves on to the rest of the graph to rewrite more tensor columns.

The example algorithms in Tables 1 and 2 may when executed (e.g. by a system such as in FIG. 2) try, each in their own way, to find an optimal partition, e.g. a list of operations each depending on data above it but not below it, the partition representing a deep tensor column. Table 1 below presents example Pseudocode for a Low CMR Detector. Table 1 describes a "greedy" detector which uses a local optimization to partition a NN. A greedy method may work by, for example, partitioning by iteratively adding a node (a graph node, as opposed to a NN node) to a deep tensor column until the adding of a node causes the deep tensor column to have a cost function exceeding a threshold. Table 2 describes a detector which uses a global optimization to partition a NN, but which uses data structures described in Table 1. Other code, and other algorithms, may be used:

TABLE 1

Classes
// Shape of a tensor. Each element is the length of the tensor along that axis or dimension.
Struct: data_shape = tuple<Rank, int> // Rank may represent the number of axes that the tensor has, so e.g. a 3D shape will have three numbers, each of which is the length of the tensor along that axis.
// Represents a portion of a larger tensor
Struct: subset<Rank, int>
    Members:
        tuple<Rank, int> origin_in_full_buffer
        data_shape shape
// Unique identifier of a node in the execution graph TABLE 1-continued

```
Using node_id_t = int
// This is a node in the execution graph. It is generic over DataType, meaning data
can store different types of values. In this pseudocode it represents a tensor or a
property of a tensor.
Struct: Node<DataType>
Members:
    // Each node in a graph gets a unique ID so it is distinguishable
    node_id_t node_id
    DataType data
// A hyper edge represents an abstract unit of execution that takes the src tensors as
inputs and has the trg tensors as outputs (trg is a target vertex of the hyper edge, and
equivalently the output of the operation)
Struct: Hyperedge<OpType>
Members:
    vector<node_id_t> srcs
    vector<node_id_t> trgs
    OpType operation // the type of operation being performed,. convolution,
pooling, softmax, shuffle, etc.
    Functions:
        endpoints( ):
            Return srcs + trgs
// A hyper-graph with hyper-edges corresponding to units of execution
// Hyper-edges are sorted in a valid order of execution
Struct: Linearized_hyper_graph<NodeT, EdgeT>
    Members:
        vector<NodeT> nodes
map<node_id_t, NodeT> node_ids // mapping may be for example done using
hashing, inputting node_id_t and returning a location in an array that can store
NodeT; other mapping functions or maps may be used.
        vector<Hyperedge<EdgeT>> ordered_edges
// Linearized_hyper_graph where nodes represent data shapes and hyper edges
represent operations, e.g. convolution, pooling, softmax, shuffle, etc.
Struct: graph = linearized_hyper_graph<data_shape, operation>
// path_decomposition encodes the sets of buffers held in memory at
// any given point in time throughout the execution
Struct: path_decomposition = vector<set<node_id_t>>
/* tensor_column_task_graph represents tasks designed to fit into some level of
cache, e.g. the L2 cache. Each task is represented by a connected component of the
tensor_column_task_graph. The nodes are subsets, as one particular task does not
read or write a whole layer of the neural network. */
Struct: tensor_column_task_graph = linearized_hyper_graph<pair<node_id_t,
subset>, operation>
Functions:
compute_est(operation op):
    // returns estimate of number of flops entailed by op (operation)
    // ex: for matrix multiply of mxn matrix with nxk kernel, would be proportional
to
// m*n*k
data_movement(operation op):
    Return op.input_data_buffer.shape( ) + op.output_data_buffer.shape( )
/* This function is a transformation on the execution graph g. It decides which hyper
edges should form a tensor column, and rewrites selected operations into tensor
columns. This is a greedy algorithm that considers one tensor column at a time.
Depending on a CMR threshold, this algorithm will look at the next hyper edge and
either add it to the current tensor column or stop adding hyper edges to the tensor
column altogether. If it stops adding hyper edges to the current tensor column, it
will start a new tensor column. */
Void Detect_and_rewrite_low_cmr_subgraphs(graph g): // CMR filter
// Below is the subgraph that represents the current tensor column under
// consideration.
graph curr_subgraph
    // set sufficiently small to filter out compute intensive ops.
// Exact value depends on constants in compute estimates; this may function as a
low CMR filter
    Float cmr_threshold
    Do:
        Found_tensor_column = false
        For edge in g.ordered_edges:
            Op = edge.operation
            If curr_subgraph is empty:
                // We allow any operation to lead (e.g. be at the beginning
of) a tensor column, regardless of CMR; here curr_subgraph is empty, so the first
operation added leads it
                Add op to curr_subgraph
            Else:
                Op_flops = compute_est(op)
                Op_mem = data_movement(op)
                Cmr = op_flops / op_mem
                If cmr < cmr_threshold: // Greedy (local optimizing)
```

TABLE 1-continued algorithm adds a subsequent/later operation to a deep tensor column if it is below a CMR threshold; if adding this next operation would go beyond the threshold, it should be added to a newly created deep tensor column, and the current deep tensor column is fixed/ended. Other thresholds may be used. While CMR is used as a cost function in this example, other cost functions may be used to determine if a deep tensor column being assembled is above a cost threshold.

```
            Add op to curr_subgraph
        Else:
            // end current tensor column
            Break
// Process has now stopped adding hyper edges to the current subgraph.
// If there is more than one hyper edge in it,
// try to rewrite it to a tensor column (it is not beneficial to rewrite the
// subgraph into a tensor column if there is only one hyper edge)
If curr_subgraph.size( ) > 1:
            // There are many potential issues preventing deep tensor columns
            from becoming too large. This loop tries to first rewrite the entire
            subgraph into a tensor column. Failing that, it tries to rewrite the
            subgraph minus the last hyper edge, and so on.
            For prefix_size in {0, . . . curr_subgraph.size( ) - 1}:
                Prefix_subgraph =
                subgraph of curr_subgraph keeping hyper-edges {0, . . .
            prefix_size}
optional<tensor_column_task_graph> task_g =
detect_breakdown(prefix_subgraph)
If task_g has value:
    Tensor_c = tensor_column(task_g)
Replace prefix_subgraph with a single hyper-edge connecting inputs and outputs in
g, with op = tensor_c
Found_tensor_column = true
Break
    // Keep trying to rewrite tensor columns until process fails to find a subgraph that
should be rewritten.
    While: Found_tensor_column
// This function tries to create a tensor_column_task_graph given a subgraph g,
// keeping the maximum working set of each task of the tensor_column_task_graph
// smaller than the L2 cache size.
tensor_column_task_graph(g, output_block_shape):
    tensor_column_task_graph task_g
    // This code assumes that output.shape( ) is the same for all output in g.outputs( )
    Full_output_subset = subset{0, g.outputs( ).front( ).shape( )}
// Iterate over each task that will be included in the task_g.
// Each task writes to its own output tile (e.g. a two-dimensional array of data) of
the full_output_subset
    For sb_in_blocked_subsets (full_output_subset, output_block_shape:
        map<node_id_t, subset> preimages_in_g
        Add node with params {out, sb} to task_g for out in g.outputs( )
    // Work backwards from outputs to inputs, finding the subset that the
// current task will compute at each layer.
        For edge in g.ordered_edges.reverse( ):
          For src in srcs(edge):
            // The preimage function finds the input subset that is
            // needed to compute the output subset for the current layer.
                Preimages_in_g[src] =
                    get_pre_image(edge, [preimages_in_g[trg] for
                    trg in trgs(edge)])
                New_src = {src, preimages_in_g[src]}
                Add new_src to task_g as a node
                Add new_src to new_srcs
            New_trgs = [{trg, preimages_in_g[trg]} for trg in trgs(edge)]
            Add hyperedge{new_srcs, new_trgs} to task_g
        Return task_g
optional<deep_column_task_graph> detect_breakdown(graph g):
    tensor_column_task_size = find_L2_cache_blocking(g)
    If tensor_column_task_size does not have value:
    Return std::nullopt
        else:
            return tensor_column_task_graph(g, *tensor_column_task_size)
// For a given cache size, try to find the shape of the output tile, so that the task
breakdown corresponding to that output tile shape will fit in cache; cache_size =
size, e.g. in bytes, of target cache
optional<data_shape> find_cache_blocking(graph g, int cache_size):
    If !shape(out_node) is same for all g.outputs( ):
        Return nullopt
    Path_decomp = get_path_decomp(g)
    // Starting from a trial shape that is the entire output shape,
    //   shrink   the   trial   shape   until   the   task   fits   in   cache
    // and there are enough tasks given the number of cores
    Trial_shape = g.outputs( )[0].shape( )
    Trial_num_tasks = 1
```

TABLE 1-continued

```
   While trial_shape does not have 0's and trial_num_tasks < num_cores:
Trial_subset = subset{0, trial_shape}
Trial_num_tasks = number of tiles of size trial subset that g.outputs( )[0].shape( ) can
be divided into
       // Get subsets of data required at each node in g (nodes are data; this is the
subset required at the node, e.g., the input to the subsequent operation that is needed
to ultimately compute the output specified by the trial_subset) to compute
trial_subset at the outputs
       map<node_id_t, subset> required_data_at_nodes =
       preimages_of_trial_subset(g, trial_subset)
       total_data = total_required_data(path_decomp, required_data_at_nodes)
       If total_data <= cache_size:
           Return trial_shape
       Divide largest coordinate of trial_shape by 2
   // Couldn't find blocking that fit in cache
   Return nullopt
optional<data_shape> find_l2_cache_blocking(graph g):
   Return find_cache_blocking(g, sys::l2_cache_size( ))
// Figure out the path decomposition of the given graph.
// This is a vector, where each entry is associated with a hyper edge and
// contains a bag of vertices that must be in memory when that hyper edge is
executed.
Path_decomposition get_path_decomp(graph g):
set<node_id_t> active_nodes
// How many of the incident edges (edges coming into/going out of vertex or node,
e.g., immediately connected to) we have handled already,
// initialized to 0 for relevant node_id_t's
map<node_id_t, size_t> incident_edges_processed;
// Get each node's total reference count (#incoming + #outgoing edges)
   unordered_map<node_id_t, size_t> node_total_ref_count_map
For edge in g.ordered_edges:
For v in edge.endpoints( ):
Node_total_ref_count_map[src_nid]++
Path_decomposition path_decomp
For edge in g.ordered_edges:
   //Add current layer's incident nodes to the active set
   active_nodes.insert(edge.endpoints( ))
   // Set current layer's active set
   path_decomp[edge] = active_nodes
   // Update incident edge count
   For v in edge.endpoints( ):
       incident_edges_processed++;
   // Detect and remove fully-processed nodes
   For v in active_nodes:
       if(node_total_ref_count_map[v] == incident_edges_processed[v])
           active_nodes.remove(v)
Return path_decomp
// A path decomposition contains the active vertices needed for each hyper edge.
// From this, a process finds the maximum size over all hyper edges
total_required_data(path_decomp, required_data_at_nodes):
   Max_bag_size = 0
   For bag in path_decomp:
       Bag_size = 0
       For node_id in bag:
       Bag_size    +=    required_data_at_nodes[node_id].prod( )    *
sizeof(float)
       Max_bag_size = max(max_bag_size, bag_size)
   Return max_bag_size
preimages_of_trial_subset(graph g, subset sb):
   map<node_id_t, subset> preimages
   preimages[output] = sb for output in g.outputs( )
   // Iterate over hyper edges in reverse topological order, getting preimage
   // of the subset at target using a preimage function on individual operations
   For edge in g.ordered_edges.reverse( ):
       Assert trg in preimages for trg in trgs(edge)
       For src in srcs(edge):
           preimages[src] = get_pre_image(edge, [preimages[trg] for trg in
trgs(edge)])
   Return preimages
```

The example pseudocode in Table 1 assumes the operations are all sequential, using the outputs of the previous operation as the inputs to the next one. However, this is not necessarily the case, as residual connections (e.g., operations that take as input data that was generated much earlier in the computation) are commonplace in modern NN architectures, for example in the Resnet50, Mobilenetv1 and v2, BERT, and Yolov3 and v5 NNs. These connections may lead to graphs with many cycles, violating the assumption that operations are all sequential.

However, a modification of the example pseudocode in Table 1 may work with general graph structures. Most of the work in translating the code in Table 1 from such "path" graphs to general graphs is already done by the fact that the pseudocode in Table 1 uses a global ordering on hyper edges, which the tensor column respects in its depthwise breakdown or partition. A further modification deals with generating preimages of a task throughout the entire tensor column, which is the key step in find_cache_blocking( ).

In a general graph structure, this becomes more complicated, as nodes may have multiple outgoing hyper edges, each of which wants a different subset of data at the node for its computation. To handle this, in the preimage function, an embodiment may use a subset of data at the node that encapsulates all the subsets requested by all the outgoing operations. Such a subset exists—the entire buffer is an example—but choosing the smallest such subset allows an embodiment to better optimize our task size for cache reuse.

The example pseudocode in Table 1 may assign a task breakdown for a tensor column by taking into consideration the target cache (e.g. L2) size, and designing the task breakdown so any individual task fits into target cache. Another property that is desirable in a good task breakdown is that enough tasks are assigned to saturate all the cores in the system running the execution. Thus some embodiments may additionally keep track of the number of tasks (e.g., represented by deep_column_task_graph data structures) in the task breakdown and create enough tasks to make sure all the cores have work. In one embodiment, all tasks created can be performed concurrently partitioning is done to keep this a small multiple of the number of cores on the system. The number of tasks may be equal to the number of tiles (or partitions) of the output tensor; a partition algorithm can control the number of tasks by choosing a particular size of output tile. The specific number of tasks to create may be optimized based on the choice of scheduling algorithm, which decides how work is distributed across cores.

Different dimensions may be treated differently when modifying or shrinking. Some dimensions are better to shrink than others, when performing a task breakdown. In particular, the batch dimension is generally a good candidate for shrinking, while the channel dimension in some embodiments is not. In the example pseudocode provided herein, shrinking happens in the function find_cache_blocking; other methods of shrinking may be used. The example loop where the shrinking is performed is commented "shrink the trial shape until the task fits in cache". This may be due to the goal of minimizing excess compute done in convolutional networks. For example, since each output channel of a convolution depends on all input channels, blocking on output channels means all input channels to a convolution is typically re-computed for each task (if the convolution reads from a buffer internal to the tensor column), which may be termed overlap. Embodiments may use heuristics in a detector for deciding which dimensions to break or alter when deciding the task partition or breakdown. Some embodiments may optimize a Roofline-inspired cost, discussed herein.

Embodiments may use transpositions in tensor columns. A core structure of tensor column task partitioning or breakdowns is to take the output (there can be multiple outputs, but one can assume one output for this discussion without loss of generality), and fully compute a subset of this output in cache. Then, an algorithm moves to the remaining subsets of this output. As discussed elsewhere herein, the exact structure of this output subset depends on the operations within the tensor column: depending on what these operations are, and how intermediate data is laid out within memory, some dimensions may be better to block along than others. Heuristics for which dimensions to block should also consider how dimensions change meaning within the tensor column. For example, if the tensor column transposes batch and channel dimensions, then heuristics that prioritize blocking the output on batches over blocking on channels could unintentionally hurt performance. An embodiment may track dimensions and how they transpose and change throughout a deep tensor column, which allows applying heuristics for creating a task breakdown without worrying about this problem.

Embodiments may include specific functionality for use with high compute units or operations. A low CMR tensor column detector may only incorporate low-compute units into tensor columns, accomplished by selecting subgraphs solely including units or operations with low compute-to-memory ratios, such as softmaxes, pooling, elementwise operations, and shuffles that transform data layout. However, maximizing performance may include incorporating units with higher compute, like convolutions and matrix multiplications, into tensor columns. The pseudocode in Table 1 may include high-compute units to start a tensor column, for example by simply disabling the CMR filter for the first unit in a tensor column. This may work well since placing the high-compute unit first typically does not increase the compute overhead of the tensor column. However, optimal tensor columns may require making trickier tradeoffs. Depending on how memory bound a section of the network is, it may make sense to put high-compute layers in tensor columns more, but this decision is also risky: if an embodiment makes too much use of this, it can increase the computation in the tensor column so much that it actually slows the process down overall.

To toe this delicate line, embodiments may include infrastructural and algorithmic improvements.

An embodiment of a low CMR Deep Tensor Column Detector may not be able to find a globally optimal deep tensor column breakdown because it is in some embodiments a greedy algorithm that can only find a locally optimal solution. An embodiment using a dynamic program for deep tensor column detection may avoid this weakness. Such a detector may find a globally optimal deep tensor column breakdown, minimizing a given cost function defined for a deep tensor column breakdown or set of partitions, under the assumption that the solution is a partition of a specific topological ordering of the original graph's hyper edges.

In such an embodiment using a dynamic program, the roofline model may be used for a cost function. However, this algorithm is not limited to any cost function, and can apply to any cost function on deep tensor columns. With explicit estimates of CMR in the tensor column detector, an embodiment can accurately estimate how memory-bound any subgraph of operations is, and how much that changes for different depthwise task breakdowns. Concretely, this may follow from estimating compute and data movement estimates of arbitrary tensor column task breakdowns, and using a task breakdown to optimize a cost function that combines these estimates similarly to the Roofline model. The whole deep tensor column task breakdown can be rewritten using this cost function, to tie it more closely to the Roofline model used as a target to optimize. Furthermore, this may allow softening hard constraints currently in the detector. For instance, the constraint that depthwise task breakdowns fit into cache can be relaxed: it lowers performance if they do not fit into cache, but the effect on performance can be estimated by assigning a higher data movement cost when the task breakdown does not fit into cache. While embodiments described herein (e.g. greedy, global, and other embodiments) may use as a standard to evaluate deep tensor columns being assembled or partitioned a cost function measured by CMR, other measures may be used.

Table 2 below presents example Pseudocode for a Dynamic Program Detector, which may take a global view of optimization, in contrast to a greedy algorithm (Note that the algorithm described in Table 2 uses data structures described in Table 1.). Other code, and other algorithms, may be used. The example algorithm in Table 2 partitions the topological ordered linearized hypergraph into tensor columns using dynamic programming.

Input: Linearized hypergraph g.
Output: Linearized hypergraph g with chosen subgraphs rewritten to deep tensor columns.
Algorithm:
  Defines a cost function on tensor columns and units of execution. The cost function may take into account the amount of compute in the tensor column/unit, as well as the overall data movement inside tensor columns (e.g. in L2 cache, L3 cache, and main memory).
    The cost function may inherently make assumptions about how data movement and compute are pipelined, as well as what are the bandwidths/latencies of accessing target caches (e.g. a working cache such as an L2 cache) relative to main memory. In particular, if data movement and compute are perfectly pipelined, the cost function is a max of (possibly properly weighted) data movement and compute. If it is not pipelined at all, it is a sum of (possibly properly weighted) data movement and compute. In practice in some embodiments, it may be a hybrid of these.
    In the perfectly pipelined case, the cost function is equivalent to the cost given by the Roofline model for the tensor column/unit's arithmetic intensity, multiplied by the amount of compute in the deep tensor column.
  The cost of a network in this context may be the sum of costs of its tensor columns and units, since an algorithm may execute tensor columns/units sequentially.
  The dynamic program may optimize the cost of the network.
Subproblem: // A subproblem may be solved for increasing sizes of hypergraphs, starting with a graph including only the first hyper edge, e_1, adding the next hyper edge e_1+1 at each iteration
  Input:
  Topologically sorted hyper edge list (e_1, ..., e_n)//E.g., use linearized hypergraph from Table 1
  An index i<=n
  An optimal way to break down a sequence of hyper edges (e_1, ..., e_k) into tensor columns for all k<=i
  Output:
  An optimal way to break down a sequence of hyper edges (e_1, ..., e_{i+1}) into tensor columns
How to Solve Subproblem:
  Let P*(i+1):=(P*_1, ..., P*_j) denote the optimal partition for (e_1, ..., e_{i+1}) into j<=i+1 pieces, such that a piece has size 1 iff it corresponds to an operation, and corresponds to a deep tensor column otherwise.
  The algorithm knows that the size of P*_j (e.g., the number of hyper edges in this part of the partition) is bigger than 0.
  So (P*1, ..., P*j-1) is an optimal partition of (e_1, ..., e_k), for some k<=i. Which the algorithm has by induction.
  So P*(i+1)=min_{k<=i} (P*(k)+cost(k+1, ..., i+1))

Where cost(k+1, ..., i+1) corresponds to the cost of putting hyper edges e_{k+1}, ..., e_{i+1} inclusive into a deep tensor column (or a unit, if k=i).

The dynamic program repeatedly or iteratively solves this subproblem by computing the minimization problem as described, e.g. by incrementing k by 1 and repeating the process above.

Table 2

The example algorithm shown in Table 2, may input a linearized hypergraph with n hyper edges termed (e_1, e_n), each hyper edge describing operations on data, where data is represented by nodes. While a greedy algorithm (as in Table 1) starts at the beginning of the graphs and at each stage either adds a hyper edge to the current deep tensor column being assembled, or creates a new deep tensor column to add to, the global algorithm in Table 2 instead solves small subproblems and remembers their solution, and when solving larger subproblems looks to the smaller problems.

In the example algorithm shown in Table 2, an algorithm may start with the smallest possible case of a hypergraph: a graph (e.g. P*(1)) containing one operation, the first operation including hyper edge e_1. The example algorithm then (e.g. by incrementing k) looks at the subsequent hyper edge e_2 and decides how to partition a graph including these two hyper edges. The process continues, incrementing k, at each stage deciding how to partition the graph representing the NN using the previous partitions. At each stage, the process tries to minimize the cost of the overall partition P*(i+1), which is defined in one example algorithm as the sum of the costs of the component partitions=(P*(k)+cost(k+1, i+1)). A global method may iteratively add a graph node (as opposed to a NN node) to a deep tensor column or partition and minimize the cost of a set of component partitions or columns within the deep tensor column or partition; this may be done iteratively.

Figure 2:
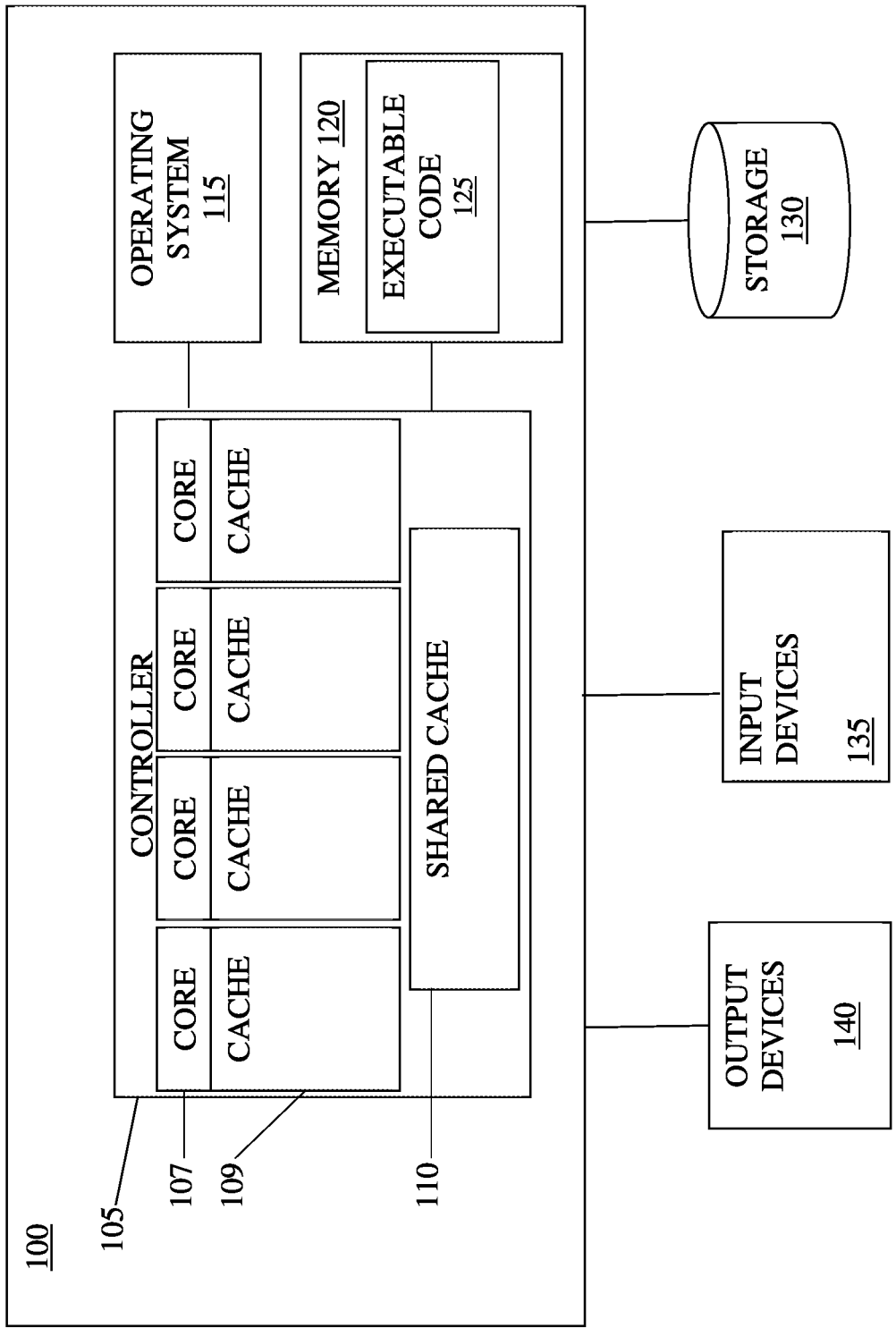
FIG. 2 shows a high-level block diagram of an exemplary computing device which may be used with embodiments of the present invention.

Embodiments may schedule execution of the resulting deep tensor columns, e.g. in a multi-core system such as shown in FIG. 2. In some embodiments it is possible to relax the assumption that all threads run in a single tensor column at a time. The "hierarchical graph" structure can be leveraged to formally model the network's data dependencies and use this information, at runtime, to execute multiple tensor columns at once, given that all of the data dependencies for each tensor column have been satisfied. This "early-start" mechanism may be particularly useful when a thread computes some subset of a tensor column's output and then moves on to executing the next tensor column, which uses that subset as input. There is an inherent trade off here between having threads move forward to execute subsequent tensor columns and finishing the current tensor column. The former can lead to more utilization of data in a cache used for execution (e.g. L2 cache), but may increase the total amount of memory being used at once because input and output data has to be maintained for each tensor column currently being executed. To combat this an embodiment may employ a notion of max depth which limits the number of tensor columns executed at the same time.

Additionally, using this formal model of the network's data dependencies, an embodiment can also reuse buffers that no longer have any "consumers" as inputs and outputs to later tensor columns. This may be valuable because it allows threads executing subsequent tensor columns to write to cache lines that are already in a target (e.g. L2) cache, reducing the total number of cache lines that have to be evicted and then brought back in. An embodiment attempting to achieve an optimal implementation may reuse a buffer as soon as possible to maximize the number of cache lines associated with that buffer that are still in L2 cache.

Complete in-cache execution (e.g., by sizing data such that it is mostly operated on in cache, without the need for memory access) may replace the traditional execution style of neural networks in which inputs and outputs of each layer are written to and accessed from memory. Its improvement is to reduce these expensive accesses to memory with low-cost cache hits. The difference in both time and power between reading or writing a data item from cache versus memory may be enormous, and thus deep tensor columns, that avoid most memory accesses, may improve NN execution by enabling low cost and low power execution of NN, in particular on CPUs, and especially CPUs in mobile and other edge devices where power consumption is crucial. Such methods may deliver significant speedups in many other settings by utilizing the cache hierarchy of the processor to avoid expensive memory bound computations. When applied to sparse neural network computation, the benefits may become larger since these computations are typically more memory bound than those of dense neural networks.

However, some disadvantages of tensor computation may be overlaps, where the processing of inputs to a layer are repeated across tensors. The same processing is performed at different times by different tensor columns, since different tensor columns may require the same input (where they overlap), and that input may be input computed internally in the NN as opposed to the "given" input provided to the NN as input. The structure of neural networks is such that as one goes backward from outputs to inputs, observing which input regions are needed to generate a region in the output, it can be seen that, for example in the context of CNNs, input regions overlap more and more.

For example, a NN operating three layers [1×1 conv, 3×3 conv, 1×1 conv] where the output size of the tensor column is [2×2] pixels, the input/output size of the first 1×1 conv will be [4×4] pixels (due to the 3×3 conv in the middle). This means that the first 1×1 conv will be used to compute approximately 4×4/2×2=4X more output coordinates than in the layer by layer execution, and so will require four times more compute. A longer series with two 3×3 convolutional operations (e.g. "conv") and same [2×2] output size produces an overlap factor of 4×4=16X, so the increase in overlapping compute grows rapidly with the number of 3×3 convolutional operations (or K1×K2 convs where either K1>1 or K2>1).

When the overlapping regions are internal to the tensor column, e.g. there is some layer in the tensor column that produces overlapping outputs, this implies redundant computation for the overlapping tensor columns. The deeper the tensor output layer, the more the computations overlap and the higher the computational cost. The challenge of breaking down a neural network computation into deep tensor columns that span many layers is that the overlaps between tensor columns get exacerbated (they get larger) the deeper the tensor is defined, e.g. the more layers the tensor contains. In some cases overlaps can increase polynomially in size with an increasing tensor column depth. Keeping a neural network computation in some cache level, e.g., the L2 cache level, would be ideal, but in some cases the overhead of these computations is so high that the benefit of the column allowing the computation to fit in cache is reduced by the cost of the recomputation at overlaps.

In some examples, redundant computation cannot occur without overlap in the preimage, but overlap in the preimage sometimes, but does not necessarily, result in redundant computation. Overlap in the preimage may indicate that if the portioning goes back further redundant calculations will occur. Adjacent or serial tensor columns may be considered as being arranged side-to-side when viewing a left-to-right NN depiction (sequential in order of operation) while parallel tensor columns may be considered as generally, with some overlap, executing across the same NN layers but on different sections of those layers.

Embodiments may be used for inference (e.g. producing an output at run time) and also training in a back-propagation process. During a training stage, input to a layer may include incoming training data, including one or more of feedback data (e.g., supervised training data) and back-propagation data (e.g., cost-function data), loss data, etc. that may be required to train a NN.

Embodiments may apply deep tensor columns as described herein to the backwards phase of training, commonly known as "backpropagation." In backpropagation, repeated steps occur during training of networks, where weights in the network are updated by applying a step of stochastic gradient descent on some set of test data. After the not-fully-trained network is evaluated, information about how the weights should change to make the model more accurate is propagated from the output backwards to each layer of the network. Doing so involves a computation at each layer in the network using intermediate results, much like in an inference. By imposing sparsity patterns among the weights, it is possible to make the workload of back-propagation memory-bound, opening the possibility of improving performance via deep tensor columns as described herein.

By putting intermediate results of backpropagation (e.g., gradients at intermediate layers in the network) into deep tensor columns, it may be possible to speed up backpropagation for neural network training on CPUs. As backpropagation is one of the most time-consuming steps of the process of training neural networks, this could lead to considerable improvements in training times on CPUs.

Embodiments may execute a NN by executing partitions, deep tensor columns created as described herein, or via other methods. Such execution may be, e.g. by a system such as in FIG. 2, or another system. As part of this, an embodiment may execute tasks or tensors designed to fit into a level of cache, e.g. a deep_column_task_graph as created as described herein, or another task. A deep_column_task_graph may be a linearized hypergraph whose hyper edges are simple operations and whose nodes are subsets. A tensor such as a deep_column_task_graph can be decomposed into disjoint subgraphs, where each subgraph writes to a different subset of the output tensors. Furthermore, a subgraph can be identified by the subset of the output that it writes to. Each subgraph may be executed as a task, and each task can be executed in parallel, with parallelism managed by e.g. a work-stealing scheduler. Different threads may be executed by different cores, in an attempt to saturate the cores, with an attempt to pin threads to cores to prevent data movement that may occur if threads migrate among cores. A task may read from input buffers and write to output buffers that can be accessed by all threads, but all intermediate results may be stored in thread-local buffers to reduce footprint, eliminate concurrency concerns (e.g. different threads each accessing the same memory locations), and to reduce data movement between processor (e.g. CPU) cores. The simple operations in the linearized hypergraph can be executed for example as high-performance primitives or generated ahead of time as part of a code-generation system. These high-performance primitives or generated functions can then be executed in the order that their operations appear in the linearized hypergraph.

These operations may be the building blocks to execute a tensor column. A tensor column may be described in the example code provided herein by its member variable, a deep_column_task_graph, which is a linearized hypergraph whose hyper edges are operations and its vertices are subsets. A deep_column_task_graph can be decomposed into disjoint subgraphs, where each subgraph writes to a different subset of the output tensor, and a subgraph can be identified by the subset of the output that it writes to.

The use of deep tensor columns, according to some embodiments, may improve processing by accelerating memory-bound layers in a NN by computing layers into the depth of the network, while their intermediate results/outputs are still resident in caches (e.g., L3/L2 caches). Non-limiting examples of memory-bound layers include:

a. Sparse layers (convolutions, and other layers);
b. Mathematical operations: plus, divide, etc.;
c. Memory shuffles between buffer formats: e.g., to ensure JITs (code resulting from just-in-time (JIT) compilation, which may be compilation during execution of a program (at run time) rather than before execution) or operations ("ops") can run efficiently; and
d. Depthwise convolutional operations.

Deep tensor columns according to some embodiments can be applied to all elements of a NN computation graph, in particular to CNNs (image/object detection) and Fully Connected Networks (Transformers/NLP) as well as element wise mathematical computations. The deep tensor columns NN breakdown for inference could also be used for the backward pass of training (only the direction changes from IN=>OUT to OUT=>IN). Deep tensor columns according to some embodiments may be improved and accelerated by avoiding off-chip/DRAM accesses, therefore, their benefit may be greater for low power chips, where the amount of DRAM channels is limited due to power consumption restrictions. Embodiments may improve NN processing by making memory-bound layers faster, for example:

a. Sparse layers: Often memory-bound by nature and TSCs (Temporal Spatial Convolution Neural Networks) may keep them in cache.
b. Element wise ops: E.g., plus, minus etc., may have a one-to-one relation, which may include no overlaps by nature. Therefore, such operations may simply go through a cache (e.g. L2 cache) directly.
c. Shuffles: Sometimes NNs include shuffles that are hard to eliminate. By having all shuffles inside tensor columns, an embodiment may not need to eliminate all of them to see a good performance.
d. Preprocessor/Postprocessor: May run efficiently as is, without the need to hard-code for specific vertical segments.
e. Accelerate Training: The same deep tensor column breakdown may be used for the backward-pass in training. One embodiment may reverse the input to output stream, and stream forward-pass results to bypass the cache, e.g., the L2 cache.
f. Laptop/Mobile/ARM processors: Embodiments may reduce power consumption due to reduced off-chip memory access; this may combine well with sparsity that reduces compute and model size.

FIG. 2 shows a high-level block diagram of an exemplary computing device which may be used with embodiments of the present invention. In some embodiments the computing device 100 of FIG. 2 may execute NN inference or training using NNs partitioned as described herein and/or partition a NN as described herein. Computing device 100 of FIG. 2 may be a NN execution or creation platform, such as a computer within a device (e.g. a car), personal computer, laptop, smartphone, workstation, server, cloud computing system, etc. A CPU typically has a cache hierarchy with faster and smaller private caches (e.g. L1, L2) and larger shared caches (e.g. L3), and includes or is connected to a large but order of magnitude slower DRAM memory. Embodiments of the present invention are described with respect to CPUs but can also be valuable in other architectures such as GPUs.

Computing device 100 may perform such functions using e.g. one or more processors such as processor 105, each of which may include multiple cores 107 (e.g. 4, 18, or other numbers), each such core having associated with it one or more private or local caches, such as an L1 cache (not shown) and a larger, lower level L2 cache 109, local to or accessible only by that core, and the multiple cores in a processor sharing an even larger, lower level shared cache 110 (e.g. L3 cache), the caches located typically within or as part of the processor on the same chip. Other caches and cache structures may be included. Although example embodiments are described in terms of L1, L2, and L3 cache levels as in Intel architectures, embodiments apply to any other architecture, with different cache designs. L1 cache may be faster and smaller than L2 cache which may be faster and smaller than L3 cache. L1 cache may be faster to access by cores than L2 cache which may be faster than L3 cache. L2 and L1 may be much smaller and faster than L3 and are separate for each core; each core may have its own L1 and L2 cache while the last level, the L3 cache may be shared across all the cores on a die. Memory 120 (e.g. DRAM typically external to the die on which the cores exist) is larger than caches but typically an order of magnitude slower memory (e.g. DRAM). Embodiments of the invention may help overcome CPUs' limitations of slower memory and less compute when compared with GPUs. CPUs often have fewer cores (e.g. less than 10) when compared with GPUs which often have thousands of cores; CPUs often have slow memory bandwidth when compared to GPUs. Embodiments described herein are directed at CPUs but can also be valuable in GPU architectures.

Cores 107 may access tasks, code and data via references to external memory 120. The manner and frequency of access of this data, and the size of the sections of data accessed, may cause the data to be kept in caches such as caches 109 and 110. Memory 120 may be external to processor 105 and for example not on the same chip as cores 107 and caches 109 and 110; as opposed to caches, which are typically on the same chip as the processor, local to the processor or internal to the processor, or closer to the processor than memory 120. In some embodiments, some or all of cache storage may be off-chip, not on the same chip as processors or cores, but in general, access to it is faster than access to memory 120. Embodiments may tailor memory accesses and the size of tensors and/or of memory needed for such processes, with the cache policy of the target processor executing the NN in mind so that after data is read to a certain cache it typically remains in cache while being read and written by a thread, until and unless it is written back to memory 120. Caches may be handled as is known in the art by a cache policy particular to the type or model of processor 105. Tensor columns may be designed to have a size such that the cache policy determines that data related to the processes is saved within a first layer of cache and/or second layer of cache.

Controller or processor 105 may be or include, for example, one or more central CPUs, one or more GPUs, a chip or any suitable computing or computational device. Processor 105 may be one integrated circuit and cores 107 may be separate processing units each reading and executing program instructions. Thus a single processor 105 can execute different instructions or threads on different cores 107 at the same time, increasing overall speed for programs that support multithreading or other parallel computing techniques.

Computing device 100 may include an operating system 115, a memory 120, a storage 130, input devices 135 and output devices 140. Operating system 115 may be or may include any code segment to coordinate, schedule, arbitrate or control operation of computing device 100, for example, scheduling execution of programs. Memory 120 may be or may include, for example, a Random Access Memory (RAM), a read only memory (ROM), a Dynamic RAM (DRAM), a Flash memory, a volatile or non-volatile memory, or other suitable storage. Memory 120 may include a plurality of, possibly different memory units. Memory 120 may store instructions to carry out a method (e.g. code 125) as described herein, and/or data such as NN data, data describing a NN, NN kernel information, etc.

Executable code 125 may be any executable code, application, program, etc. and may be executed by controller 105. Executable code 125 may when executed cause NN execution or inference, or the partition of a NN, according to embodiments described herein. For the various modules and functions described herein, one or more computing devices 100 or components of computing device 100 may be used. Devices that include components similar or different to those included in computing device 100 may be used and may be connected to a network and used as a system. One or more processor(s) 105 including cores in processor(s) 105 may be configured to carry out embodiments of the present invention by for example executing software or code.

Storage 130 may be or may include, for example, a hard disk drive, a floppy disk drive, a Compact Disk (CD) drive, a universal serial bus (USB) device or other suitable storage. Data such as instructions, code, NN model data, parameters, etc. may be stored in a storage 130 and may be loaded from storage 130 into a memory 120 where it may be processed by controller 105. In some cases such data may be loaded from a lower level cache to a higher level cache. Some of the components shown in FIG. 2 may be omitted.

Input devices 135 may be or may include for example a mouse, a keyboard, a touch screen etc. Output devices 140 may include displays, speakers and/or any other suitable output devices. Any suitable number of output devices may be operatively connected to computing device 100 as shown by block 140. Any applicable input/output (I/O) devices may be connected to computing device 100.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, cause or configure the processor to carry out methods disclosed herein.

Figure 3:
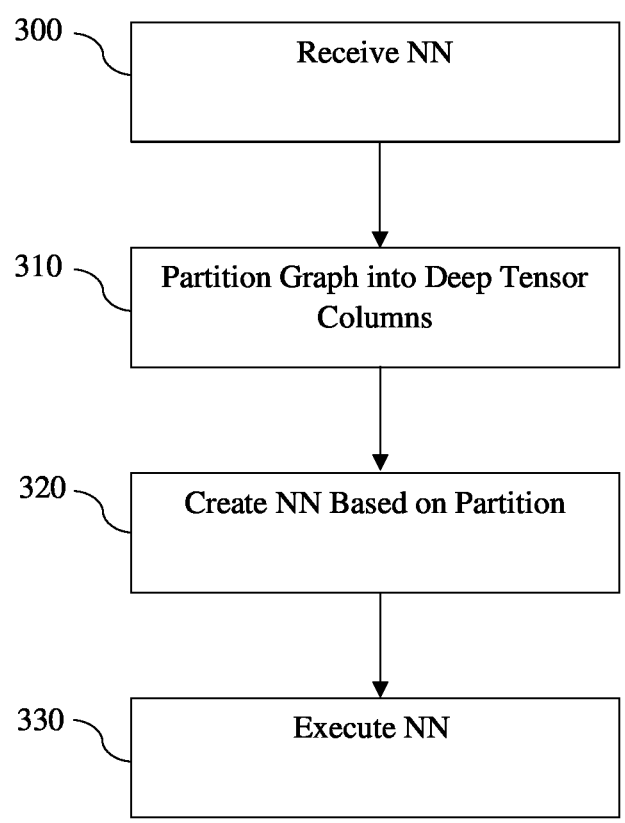
FIG. 3 is a flowchart depicting a method according to embodiments of the present invention.

FIG. 3 is a flowchart depicting a method according to embodiments of the present invention. The operations of FIG. 3 may be used with systems and NN architectures such as depicted in FIGS. 1 and 2, but other systems and architectures may be used.

In operation 300 a representation of a NN may be received. In one embodiment, that representation is a hypergraph with hyper-edges corresponding to units of execution, but in other embodiments other graphs, or representations may be used.

In operation 310, the NN or its graph representation may be partitioned into deep tensor columns. For example, an algorithm as in Table 1 and/or Table 2 may be used, or another suitable algorithm.

In operation 320 a NN may be created based on the partition: for example an appropriate compiler, such as the DeepSparse engine provided by Neuralmagic, of Somerville, Massachusetts, may convert deep tensor columns in graph form into code which executes a NN. In other embodiments, the partitions themselves may include or constitute appropriate code which, when executes, executes the NN.

In operation 330 the NN may execute or be executed, e.g. at inference, accepting input and producing output. For example, a number of deep tensor columns may be identified, and each of the identified deep tensor columns may be executed in order to execute the NN. For example, a scheduler may execute each deep tensor column as a thread in a processor. Execution may include receiving a set of NN partitions, each NN partition comprising a graph comprising nodes and hyper edges, each node representing data and each hyper edge representing an operation in the NN, such that the operations in each partition, when executed, use only data which fits within a preselected cache.

Other or different operations may be used.

Multi-socket scheduling may be implemented above this multi hierarchical partitioning logic.

The specific breakdown of NN processing into tensor column tasks may depend on the processor (e.g. CPU) architecture, hardware, number of cores, and shared and private cache sizes; thus the breakdown may need to be performed at run-time when these parameters are known, to achieve best possible performance. Embodiments may allow the threads running the various tensor column computations to run a synchronization and memoization (e.g. storing or caching results of function calls for use in the future) algorithm to share each other's overlapping computations without having to coordinate through memory or recompute from scratch, e.g., by using other synchronization tools such as atomics.

Tensor columns may need to synchronize their input/outputs to avoid conflicting overwrites of data. To detect where this synchronization is needed, the dependencies between tensors (for example, represented by a graph) may be used. If a collection of tasks run serially (for example, inside a single thread), then synchronization would not be necessary. However, if the tasks are running concurrently (e.g. in different threads), then atomics or other methods may be used.

Embodiments may convert a hyper graph representation "G" of a NN to a linearized hyper graph. An embodiment may construct a graph called a Unit Dependency Graph, a directed acyclic graph (DAG), and using this, apply a standard algorithm to obtain a topological ordering of the unit dependency graph. Then the hyper edges from the hyper graph NN representation may be placed in the order that they appear in the Unit Dependency Graph. To form a Unit Dependency Graph, an embodiment may ensure that for any hyper edge A that must come before unit B in the computation, there is a path from the output of hyper edge A to the input of hyper edge B in the dependency graph. The dependencies in G are represented as indices into a list of ordered readers and updaters that are stored on the vertices. For each source vertex read by a hyper edge in G, there is a number associated with the hyper edge, which means that the source vertex is to be updated that number of times before the operation associated with the hyper edge is performed. Similarly, for each target vertex updated by a hyper edge, there is a number associated with the hyper edge (e.g. called the updater index) and the updates to a target vertex must be performed in the order prescribed by the hyperedges' updater indices.

The nodes of the unit dependency graph may include the tuple (v, is_reader), where v is a node in G, i is an index into the ordered_readers or ordered_updaters list of v, and is_reader indicates whether this node corresponds to a reader or an updater of g. Note that there is one node for every endpoint of every hyper edge in G.

There may be two kinds of edges in a unit dependency graph: unit edges and dependency edges. For every edge in G, there is a unit edge in the unit dependency graph. For example:

Unit Edges: If there is a hyper edge in G from source vertex u to target vertex v that is the i-th reader of u and the j-th updater of v, then there is an edge in the unit dependency graph from (u, i, true) to (v, j, false), which represents this part of the hyper edge.

Dependency Edges: If there are two units A and B (which correspond to "unit edges" in the dependency graph) an embodiment may make sure unit A comes before B after a topological sort. To do this, for each node v in the original graph, an embodiment may add dependencies between the readers and updaters that update v, so that the readers and updaters are executed in the correct order or an equivalent order. For example, an embodiment may add dependency edges from unit A to B such that A and B are readers or updaters of v, and A must come before B. To do this it suffices to add an edge from the "updater" of A to the "reader" of B.

Once the unit dependency graph is formed, an embodiment can apply a standard topological sorting algorithm such as depth first search on the unit dependency graph, and the linearized hypergraph is formed by placing the hyper edges of G in a list in the order that their unit edges appear in the unit dependency graph.

Embodiments may make use of quantization, which may compress values such as those stored in kernels, or activations, by representing floating point parameters as more granular values such as integers or floating point values with less precision. Quantization may make kernels for operations like sparse convolutions and sparse matrix multiplications much smaller, as the size of the kernel is proportional to the number of nonzeros in it. Since the resulting kernel values are much smaller (e.g., 2 or 4 times smaller) than their floating point counterparts, an embodiment may store all kernels for operations within a tensor column in cache, while still leaving space in cache to store the activations. This subtle but important fact motivates the following observation: since the kernels for quantized networks may be so much smaller, an embodiment may store many more of them in cache compared to the original dense, floating point versions. One of the limiting factors on size and structure for original (e.g. non-quantized) tensor columns was that in some implementations all kernels needed to be stored in cache simultaneously; in an embodiment which can store many more of them in cache simultaneously, tensor columns may be used that span many more operations and layers than otherwise (e.g., are deeper).

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as falling within the true spirit of the invention.

Various embodiments have been presented. Each of these embodiments may of course include features from other embodiments presented, and embodiments not specifically described may include various features described herein.

The invention claimed is:

1. A method of partitioning a neural network (NN), the method comprising:
receiving a representation of a NN comprising nodes and edges; and
identifying a deep tensor column comprising a subset of the nodes and a subset of the edges, such that the operations in the deep tensor column, when executed, use only data which fits within a preselected cache and wherein identifying a deep tensor column comprises using a cost function measured by the compute to memory ratio of the deep tensor column, the compute to memory ratio determining a measure of the ratio of compute to memory accesses.

2. The method of claim 1, where data fits within a preselected cache when, during execution in a processor according to the processor's cache policy, it is expected that a cache eviction is not expected until the end of the execution of the task.

3. The method of claim 1, wherein partitioning comprises iteratively adding a data item in the NN to a deep tensor column until the adding of a data item causes the deep tensor column to have a cost function exceeding a threshold.

4. The method of claim 1, wherein partitioning comprises iteratively adding a data item in the NN to a deep tensor column and minimizing the cost of a set of component partitions comprised in the deep tensor column.

5. The method of claim 1, comprising identifying a plurality of deep tensor columns, and executing the plurality of deep tensor columns in order to execute the NN.

6. The method of claim 1, wherein the deep tensor column comprises a set of elemental operations which form a portion of a layer of the NN.

7. The method of claim 1, wherein identifying a deep tensor column comprises adding an operation to a deep tensor column if the compute to memory ratio of the operation is below a threshold.

8. A system for partitioning a neural network (NN), the system comprising:
a memory; and
a processor to:
receive a NN comprising nodes and edges; and
identify a deep tensor column comprising a subset of the nodes and a subset of the edges, such that the operations in the deep tensor column, when executed, use only data which fits within a preselected cache; wherein identifying a deep tensor column comprises using a cost function measured by the compute to memory ratio of the deep tensor column, the compute to memory ratio determining a measure of the ratio of compute to memory accesses.

9. The system of claim 8, where data fits within a preselected cache when, during execution in a processor according to the processor's cache policy, it is expected that a cache eviction is not expected until the end of the execution of the task.

10. The system of claim 8, wherein partitioning comprises iteratively adding a data item in the NN to a deep tensor column until the adding of a data item causes the deep tensor column to have a cost function exceeding a threshold.

11. The system of claim 8, wherein partitioning comprises iteratively adding a data item in the NN to a deep tensor column and minimizing the cost of a set of component deep tensor columns comprised in the deep tensor column.

12. The system of claim 8, wherein the processor is to identify a plurality of deep tensor columns, and the plurality of deep tensor columns are executed in order to execute the NN.

13. The system of claim 8, wherein the deep tensor column comprises a set of elemental operations which form a portion of a layer of the NN.

14. The system of claim 8, wherein identifying a deep tensor column comprises adding an operation to a deep tensor column if the compute to memory ratio of the operation is below a threshold.

15. A method of executing a neural network (NN), the method comprising:
receiving a set NN partitions, each NN partition comprising nodes and edges, such that the operations in each partition, when executed, use only data which fits within a preselected cache, wherein the NN partitions are identified using a cost function measured by the compute to memory ratio of a partition, the compute to memory ratio determining a measure of the ratio of compute to memory accesses; and
executing the plurality of NN partitions in order to execute the NN.

16. The method of claim 15, where data fits within a preselected cache when, during execution in a processor according to the processor's cache policy, it is expected that a cache eviction is not expected until the end of the execution of the task.

17. The method of claim 15, comprising partitioning the NN by iteratively adding a data item in the NN to a partition until the adding of a data item causes the partition to have a cost function exceeding a threshold.

18. The method of claim 15, comprising partitioning the NN by iteratively adding a data item in the NN to partition and minimizing the cost of a set of component partitions comprised in the deep tensor column.

19. The method of claim 15, wherein the partition comprises a set of elemental operations which form a portion of a layer of the NN.

20. The method of claim 15, wherein identifying a partition comprises adding an operation to a partition if the compute to memory ratio of the operation is below a threshold.

* * * * *